US012726874B2

(12) United States Patent
Hwang et al.

(10) Patent No.: US 12,726,874 B2
(45) Date of Patent: Sep. 1, 2026

(54) INTEGRATED ACCESS BACKHAULED NODE AND COMMUNICATION METHOD OF INTEGRATED ACCESS BACKHAULED NODE IN WIRELESS COMMUNICATION SYSTEM

(71) Applicant: Samsung Electronics Co., Ltd., Suwon-si (KR)

(72) Inventors: June Hwang, Suwon-si (KR); Soenghun Kim, Suwon-si (KR); Beomsik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 18/019,318

(22) PCT Filed: Aug. 4, 2021

(86) PCT No.: PCT/KR2021/010283

§ 371 (c)(1),
(2) Date: Feb. 2, 2023

(87) PCT Pub. No.: WO2022/031045

PCT Pub. Date: Feb. 10, 2022

(65) Prior Publication Data

US 2023/0292211 A1 Sep. 14, 2023

(30) Foreign Application Priority Data

Aug. 5, 2020 (KR) ........................ 10-2020-0098237
Dec. 21, 2020 (KR) ........................ 10-2020-0180137
Apr. 1, 2021 (KR) ........................ 10-2021-0042817

(51) Int. Cl.
*H04W 36/30* (2009.01)
*H04W 36/00* (2009.01)
*H04W 40/36* (2009.01)

(52) U.S. Cl.
CPC ...... *H04W 36/305* (2018.08); *H04W 36/0011* (2013.01); *H04W 40/36* (2013.01)

(58) Field of Classification Search
CPC ........... H04W 36/305; H04W 36/0011; H04W 40/36; H04W 76/18; H04W 76/19; H04W 84/04; H04W 84/047
See application file for complete search history.

(56) References Cited

U.S. PATENT DOCUMENTS 9,503,970 B2 11/2016 Horn et al.
2020/0100298 A1 3/2020 Pan et al.
(Continued)

FOREIGN PATENT DOCUMENTS

CN 110536350 A 12/2019
EP 3927009 A 12/2021
(Continued)

OTHER PUBLICATIONS

Qualcomm Incorporated (Rapporteur); Report email discussion [Posti 09e#36][IAB] RLF Handling Open Issues; 3GPP TSG-RAN WG2 Meeting #109e-bis; R2-2003813; Apr. 17, 2020.
(Continued)

*Primary Examiner* — Hashim S Bhatti
(74) *Attorney, Agent, or Firm* — Jefferson IP Law, LLP

(57) ABSTRACT

According to an embodiment of the present disclosure, a method of a first Integrated Access Backhauled (IAB) node in a wireless communication signal may include receiving, from a parent IAB node, Radio Link Failure (RLF) detection indication, and based on receiving of the RLF detection indication, performing handover to a target cell or routing to a different path other than a path via the parent IAB node or operation resumption with respect to the parent IAB node.

9 Claims, 14 Drawing Sheets

(56) References Cited

U.S. PATENT DOCUMENTS

| | | | | |
|---|---|---|---|---|
| 2020/0221329 | A1 | 7/2020 | Kim | |
| 2021/0378041 | A1* | 12/2021 | Narasimha | H04W 76/19 |
| 2022/0007212 | A1 | 1/2022 | Hwang et al. | |
| 2022/0394797 | A1* | 12/2022 | Pradas | H04W 76/30 |
| 2023/0080014 | A1* | 3/2023 | Fujishiro | H04W 36/362<br>370/315 |
| 2023/0143694 | A1* | 5/2023 | Muhammad | H04W 24/04<br>370/225 |
| 2025/0106925 | A1* | 3/2025 | Jung | H04W 76/19 |

FOREIGN PATENT DOCUMENTS

| | | | |
|---|---|---|---|
| KR | 10-1416301 | B1 | 8/2014 |
| KR | 10-2019-0127561 | A | 11/2019 |
| KR | 10-2020-0035850 | A | 4/2020 |
| KR | 10-2020-0086625 | A | 7/2020 |
| WO | 2020/059633 | A1 | 3/2020 |
| WO | 2020/060913 | A1 | 3/2020 |
| WO | 2020/067791 | A1 | 4/2020 |

OTHER PUBLICATIONS

Extended European Search Report date Jan. 2, 2024, issued in European Patent Application No. 21854638.0.

* cited by examiner

FIG. 9

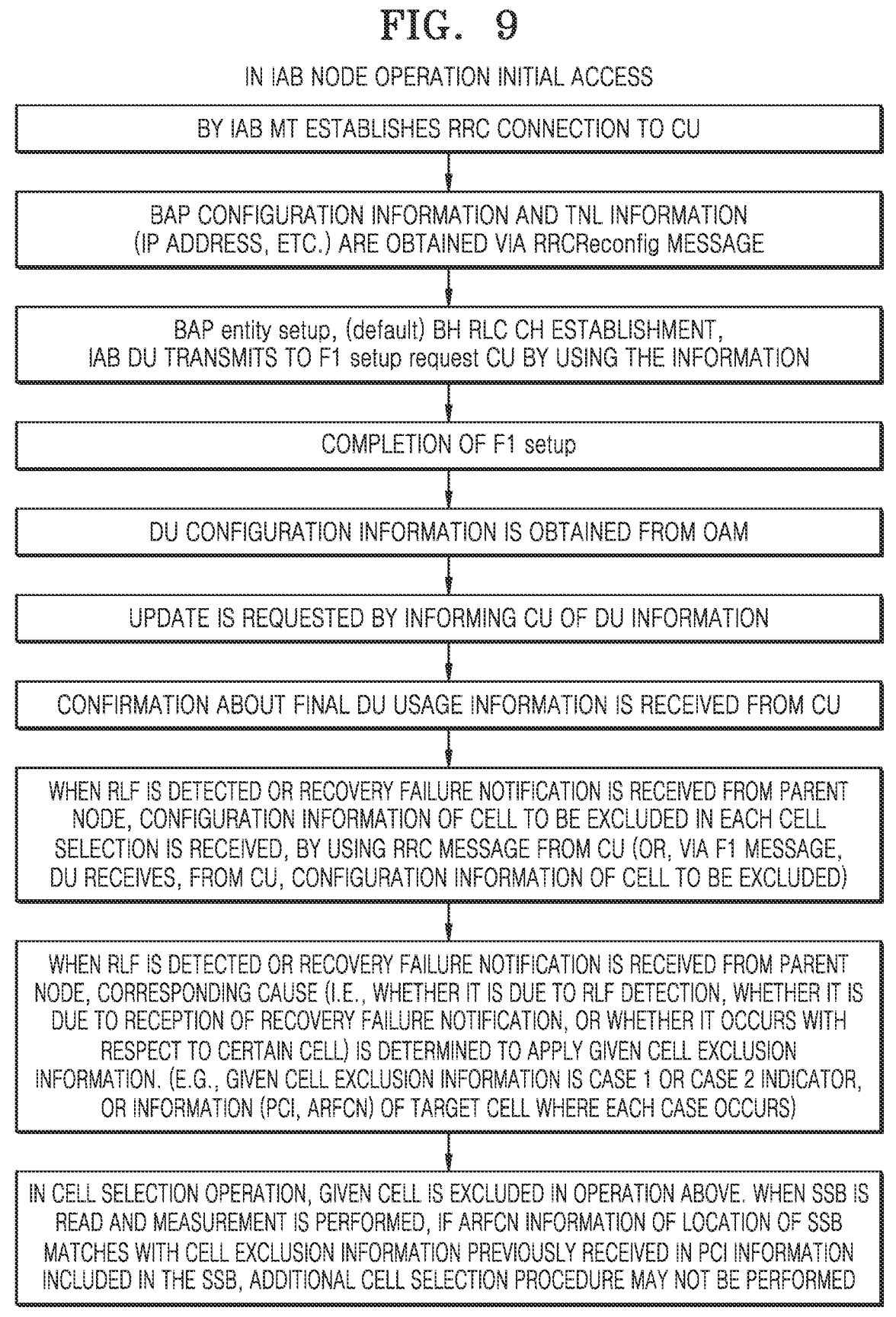

IN IAB NODE OPERATION INITIAL ACCESS

BY IAB MT ESTABLISHES RRC CONNECTION TO CU

BAP CONFIGURATION INFORMATION AND TNL INFORMATION (IP ADDRESS, ETC.) ARE OBTAINED VIA RRCReconfig MESSAGE BAP entity setup, (default) BH RLC CH ESTABLISHMENT, IAB DU TRANSMITS TO F1 setup request CU BY USING THE INFORMATION COMPLETION OF F1 setup

DU CONFIGURATION INFORMATION IS OBTAINED FROM OAM

UPDATE IS REQUESTED BY INFORMING CU OF DU INFORMATION

CONFIRMATION ABOUT FINAL DU USAGE INFORMATION IS RECEIVED FROM CU

WHEN RLF IS DETECTED OR RECOVERY FAILURE NOTIFICATION IS RECEIVED FROM PARENT NODE, CONFIGURATION INFORMATION OF CELL TO BE EXCLUDED IN EACH CELL SELECTION IS RECEIVED, BY USING RRC MESSAGE FROM CU (OR, VIA F1 MESSAGE, DU RECEIVES, FROM CU, CONFIGURATION INFORMATION OF CELL TO BE EXCLUDED)

WHEN RLF IS DETECTED OR RECOVERY FAILURE NOTIFICATION IS RECEIVED FROM PARENT NODE, CORRESPONDING CAUSE (I.E., WHETHER IT IS DUE TO RLF DETECTION, WHETHER IT IS DUE TO RECEPTION OF RECOVERY FAILURE NOTIFICATION, OR WHETHER IT OCCURS WITH RESPECT TO CERTAIN CELL) IS DETERMINED TO APPLY GIVEN CELL EXCLUSION INFORMATION. (E.G., GIVEN CELL EXCLUSION INFORMATION IS CASE 1 OR CASE 2 INDICATOR, OR INFORMATION (PCI, ARFCN) OF TARGET CELL WHERE EACH CASE OCCURS)

IN CELL SELECTION OPERATION, GIVEN CELL IS EXCLUDED IN OPERATION ABOVE. WHEN SSB IS READ AND MEASUREMENT IS PERFORMED, IF ARFCN INFORMATION OF LOCATION OF SSB MATCHES WITH CELL EXCLUSION INFORMATION PREVIOUSLY RECEIVED IN PCI INFORMATION INCLUDED IN THE SSB, ADDITIONAL CELL SELECTION PROCEDURE MAY NOT BE PERFORMED

FIG. 10

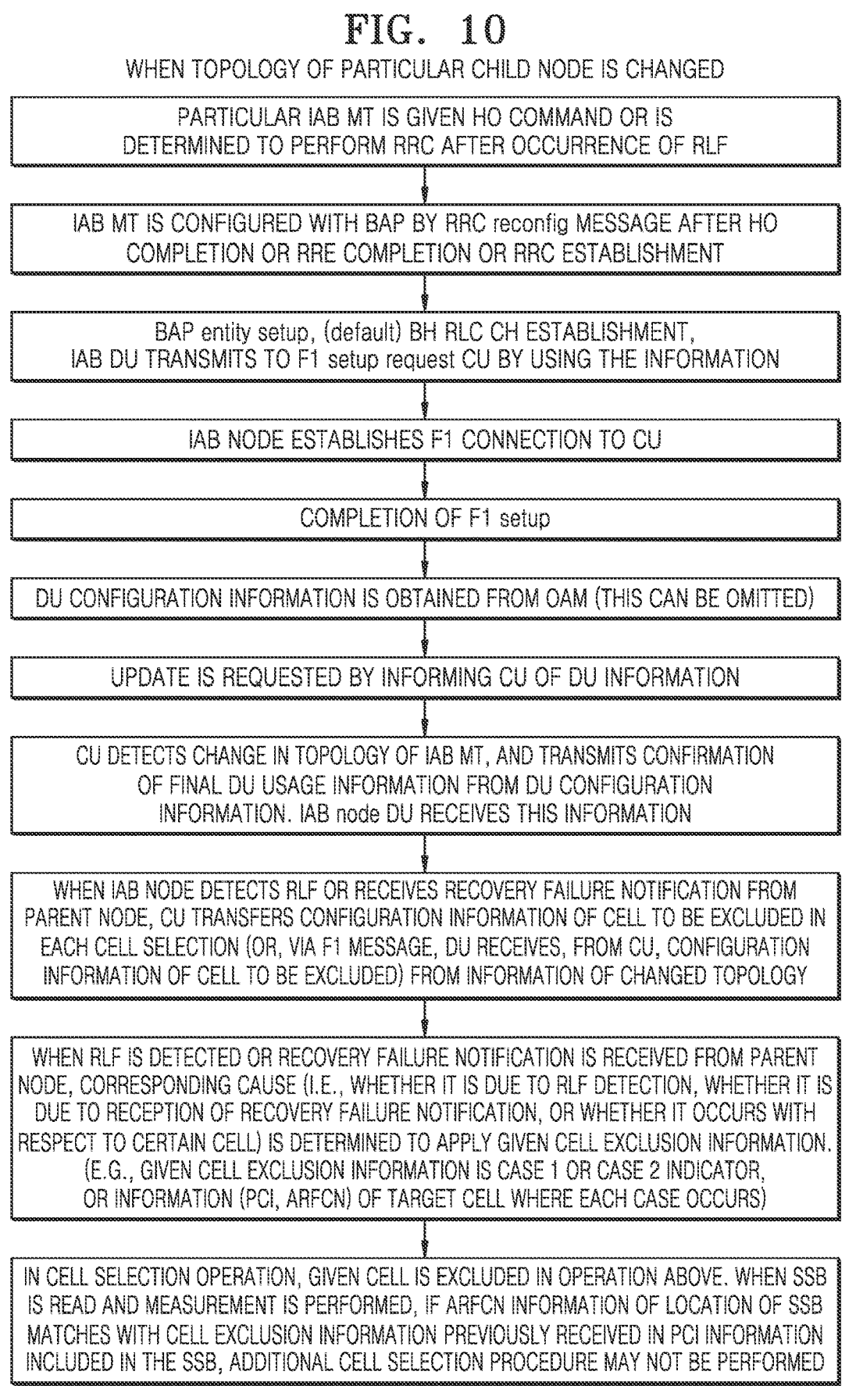

WHEN TOPOLOGY OF PARTICULAR CHILD NODE IS CHANGED

PARTICULAR IAB MT IS GIVEN HO COMMAND OR IS DETERMINED TO PERFORM RRC AFTER OCCURRENCE OF RLF

IAB MT IS CONFIGURED WITH BAP BY RRC reconfig MESSAGE AFTER HO COMPLETION OR RRE COMPLETION OR RRC ESTABLISHMENT BAP entity setup, (default) BH RLC CH ESTABLISHMENT, IAB DU TRANSMITS TO F1 setup request CU BY USING THE INFORMATION

IAB NODE ESTABLISHES F1 CONNECTION TO CU

COMPLETION OF F1 setup

DU CONFIGURATION INFORMATION IS OBTAINED FROM OAM (THIS CAN BE OMITTED)

UPDATE IS REQUESTED BY INFORMING CU OF DU INFORMATION

CU DETECTS CHANGE IN TOPOLOGY OF IAB MT, AND TRANSMITS CONFIRMATION OF FINAL DU USAGE INFORMATION FROM DU CONFIGURATION INFORMATION. IAB node DU RECEIVES THIS INFORMATION WHEN IAB NODE DETECTS RLF OR RECEIVES RECOVERY FAILURE NOTIFICATION FROM PARENT NODE, CU TRANSFERS CONFIGURATION INFORMATION OF CELL TO BE EXCLUDED IN EACH CELL SELECTION (OR, VIA F1 MESSAGE, DU RECEIVES, FROM CU, CONFIGURATION INFORMATION OF CELL TO BE EXCLUDED) FROM INFORMATION OF CHANGED TOPOLOGY WHEN RLF IS DETECTED OR RECOVERY FAILURE NOTIFICATION IS RECEIVED FROM PARENT NODE, CORRESPONDING CAUSE (I.E., WHETHER IT IS DUE TO RLF DETECTION, WHETHER IT IS DUE TO RECEPTION OF RECOVERY FAILURE NOTIFICATION, OR WHETHER IT OCCURS WITH RESPECT TO CERTAIN CELL) IS DETERMINED TO APPLY GIVEN CELL EXCLUSION INFORMATION. (E.G., GIVEN CELL EXCLUSION INFORMATION IS CASE 1 OR CASE 2 INDICATOR, OR INFORMATION (PCI, ARFCN) OF TARGET CELL WHERE EACH CASE OCCURS)

IN CELL SELECTION OPERATION, GIVEN CELL IS EXCLUDED IN OPERATION ABOVE. WHEN SSB IS READ AND MEASUREMENT IS PERFORMED, IF ARFCN INFORMATION OF LOCATION OF SSB MATCHES WITH CELL EXCLUSION INFORMATION PREVIOUSLY RECEIVED IN PCI INFORMATION INCLUDED IN THE SSB, ADDITIONAL CELL SELECTION PROCEDURE MAY NOT BE PERFORMED

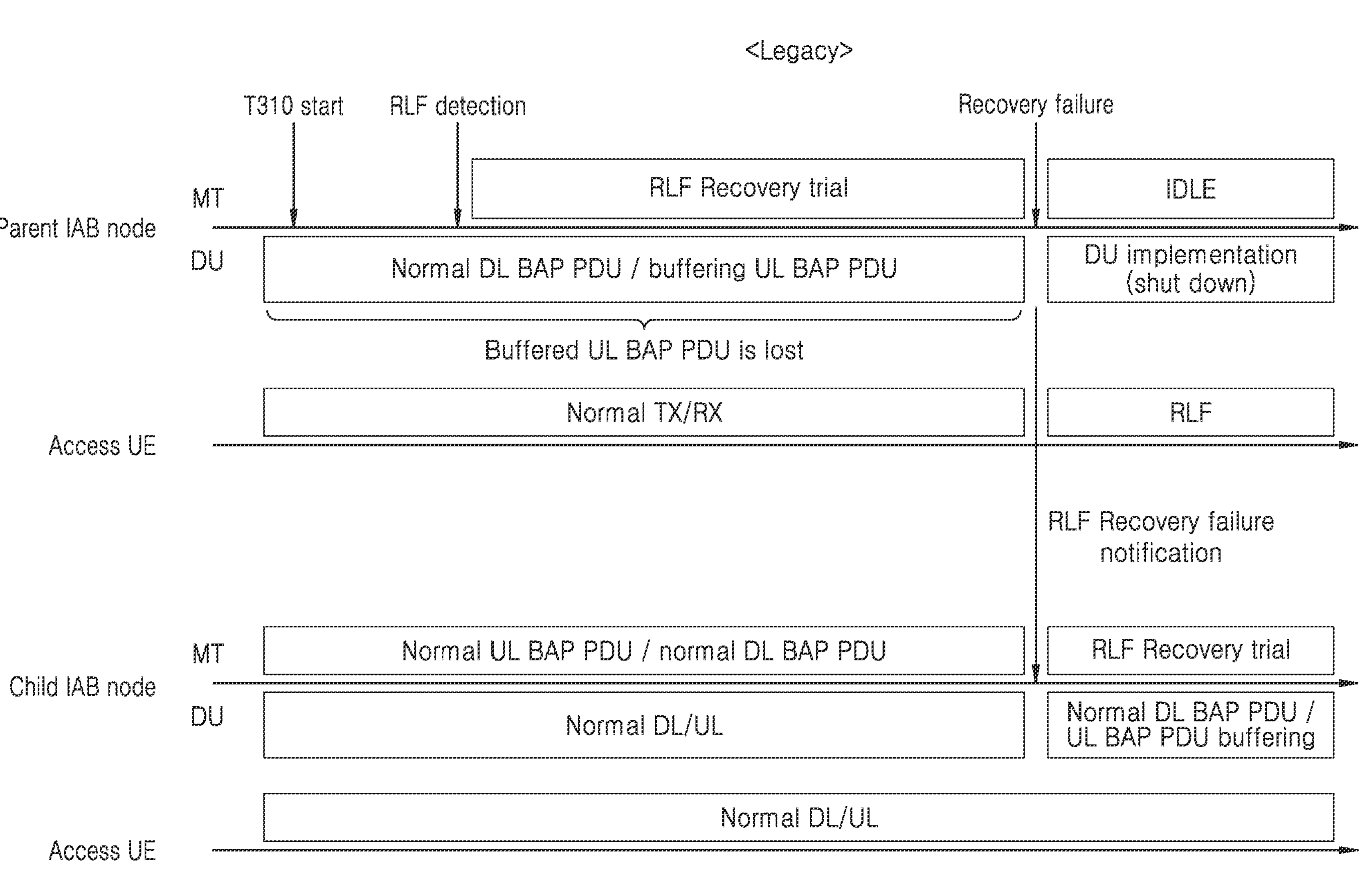
FIG. 13
<Legacy>
T310 start
RLF detection
Recovery failure
Parent IAB node
MT
DU
RLF Recovery trial
IDLE
Normal DL BAP PDU / buffering UL BAP PDU
DU implementation (shut down)
Buffered UL BAP PDU is lost
Access UE
Normal TX/RX
RLF
RLF Recovery failure notification
Child IAB node
MT
DU
Normal UL BAP PDU / normal DL BAP PDU
RLF Recovery trial
Normal DL/UL
Normal DL BAP PDU / UL BAP PDU buffering
Access UE
Normal DL/UL

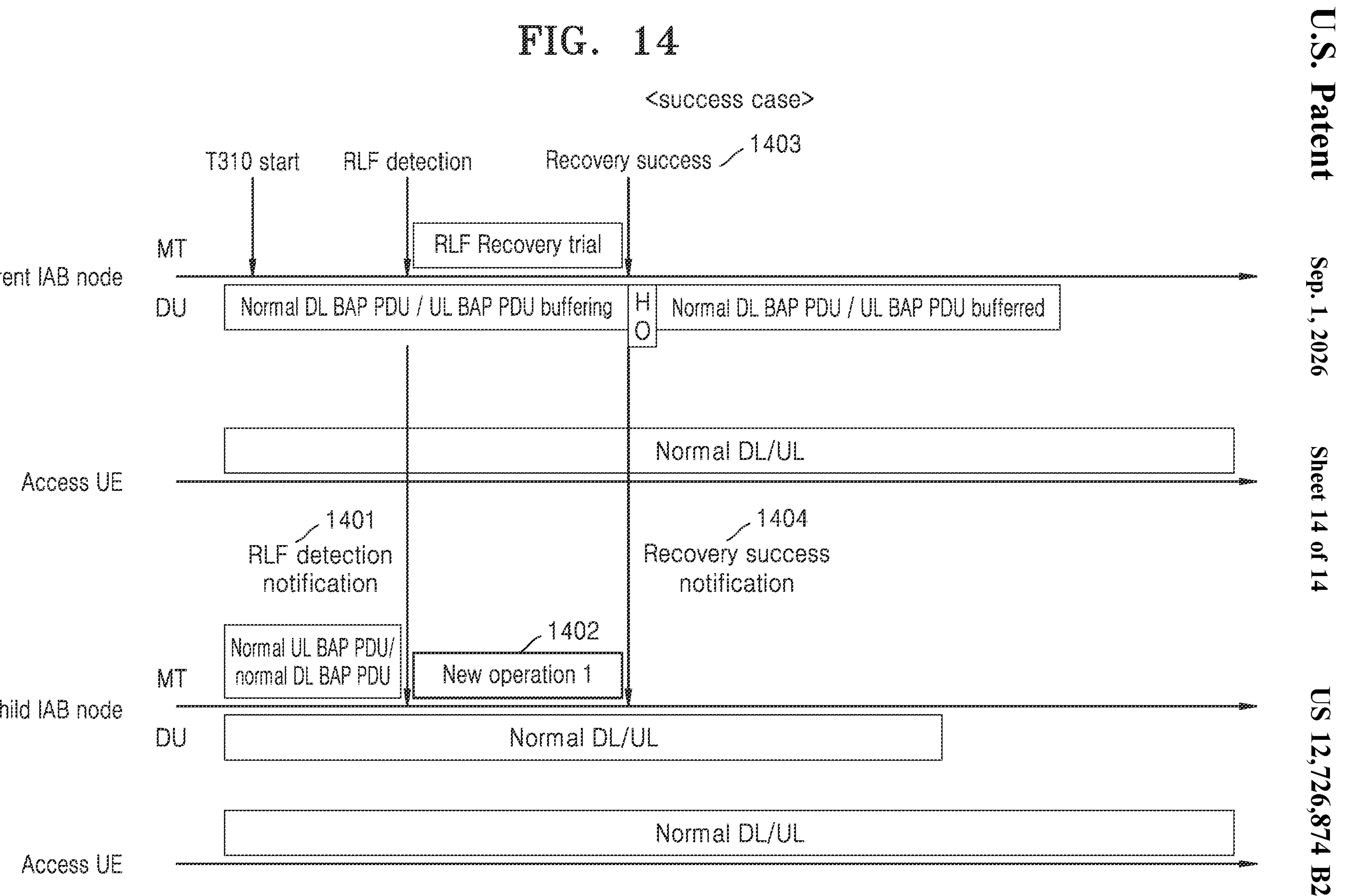
FIG. 14
<success case>
T310 start
RLF detection
Recovery success
1403
Parent IAB node
MT
DU
RLF Recovery trial
Normal DL BAP PDU / UL BAP PDU buffering
HO
Normal DL BAP PDU / UL BAP PDU bufferred
Access UE
Normal DL/UL
1401
RLF detection notification
1404
Recovery success notification
1402
Child IAB node
MT
DU
Normal UL BAP PDU/ normal DL BAP PDU
New operation 1
Normal DL/UL
Access UE
Normal DL/UL

INTEGRATED ACCESS BACKHAULED NODE AND COMMUNICATION METHOD OF INTEGRATED ACCESS BACKHAULED NODE IN WIRELESS COMMUNICATION SYSTEM

TECHNICAL FIELD

The present disclosure relates to a wireless communication system, and more particularly, to a cell selection enhancement method and a failure processing method for an integrated access backhauled (IAB) system.

BACKGROUND ART

In order to satisfy exponentially increasing demand with respect wireless data traffic due to the commercialization of $4^{th}$ generation (4G) communication systems and multimedia services, efforts have been made to develop $5^{th}$ generation (5G) or pre-5G communication systems. For this reason, 5G or pre-5G communication systems are called 'beyond 4G network' communication systems or 'post long term evolution (post-LTE)' systems. In order to achieve high data rates, implementation of 5G communication systems in an ultra-high frequency millimeter-wave (mmWave) band (e.g., a 60-gigahertz (GHz) band) is being considered. In order to reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied.

In order to improve performance of system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and received-interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA) have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. In order to implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology using beamforming, MIMO, and array antennas. Application of cloud radio access network (Cloud-RAN) as the above-described big data processing technology may be an example of convergence of 5G communication technology and IoT technology.

As various services can be provided due to the development of wireless communication systems, methods for effectively providing these services are required.

DISCLOSURE

Technical Problem

The present disclosure proposes a method by which a disconnected link is recovered by excluding particular cell selection according to topology when an Integrated Access Backhauled (IAB) node experiencing a radio link failure performs an operation for cell selection. Also, provided is a method by which, in a link failure between IAB nodes, a lower node can rapidly perform handover via transfer of a failure indicator to the lower node from an IAB node.

Embodiments of the present disclosure provide an apparatus and method for effectively providing a service in a mobile communication system.

Technical Solution

Based on entire topology information re-determined in access and handover by an Integrated Access Backhauled (IAB) node, an IAB donor central unit (CU) or an IAB donor node may transmit, to each IAB node, information about a cell to be excluded in cell selection. When an IAB node having received the information transmitted by the IAB donor CU or the IAB donor node has to perform cell reselection due to occurrence of a link problem, the IAB node excludes a cell corresponding to the information, so that an additional link failure may be prevented in advance.

Also, in a radio link failure, the IAB node may immediately notify the radio link failure to its lower terminal, so that the lower terminal can immediately perform handover to a different parent terminal. As the lower terminal is able to immediately perform handover to the different parent terminal, data delayed during a link failure recovery time or data that can be finally missing may be protected.

An aspect of the present disclosure may provide a communication method of a first IAB node in a wireless communication signal, the communication method including receiving, from a parent IAB node, Radio Link Failure (RLF) detection indication, and performing at least one of handover to a target cell, routing to a different path other than a path via the parent IAB node, or operation resumption with respect to the parent IAB node based on the RLF detection indication.

In an embodiment of the present disclosure, the performing of the handover to the target cell may include performing the handover to the target cell that satisfies a condition corresponding to the RLF detection indication, and transmitting, to the target cell, uplink (UL) Backhaul Adaptation Protocol (BAP) data stored in a buffer.

In an embodiment of the present disclosure, the performing of the routing to the different path other than the path via the parent IAB node may include identifying, based on a BAP routing entry, the different path other than the path via the parent IAB node, and in case that the different path other than the path via the parent IAB node is available, performing the routing to the available different path and then transmitting UL BAP data.

In an embodiment of the present disclosure, the performing of the handover to the target cell may include starting a timer included in the RLF detection indication, and when recovery success notification is not received from the parent IAB node before the timer is expired, performing the handover to the target cell.

In an embodiment of the present disclosure, the performing of the operation resumption with respect to the parent IAB node may include starting a timer included in the RLF detection indication, before the timer is expired, receiving RLF recovery success notification from the parent IAB node, and based on the RLF recovery success notification, transmitting, to the parent IAB node, UL BAP data stored in a buffer.

In an embodiment of the present disclosure, the RLF recovery success notification may include at least one of BAP address information of a node having transmitted the RLF detection indication, or BAP configuration information being newly configured after RLF recovery success.

In an embodiment of the present disclosure, the RLF detection indication may be transmitted using a BAP control plane signal In an embodiment of the present disclosure, the communication method may further include muting an IAB-support indicator of a System Information Block (SIB), based on the RLF detection indication.

In an embodiment of the present disclosure, the RLF detection indication may include at least one of RLF type information, type information of a link where an RLF has occurred, information about an operation used for RLF recovery by an IAB node having detected the RLF, information about a cell or node where the RLF is detected, or information about a timer.

Another aspect of the present disclosure may provide a communication method of a second IAB node in a wireless communication signal, the communication method including detecting a RLF, transmitting, to a child IAB node, RLF detection indication, and attempting RLF recovery.

In an embodiment of the present disclosure, the communication method may further include, when the RLF recovery is successful, transmitting, to the child IAB node, RLF recovery success notification.

In an embodiment of the present disclosure, the RLF recovery success notification may include at least one of BAP address information, or BAP configuration information being newly configured after the RLF recovery is successful.

In an embodiment of the present disclosure, the RLF detection indication may include at least one of RLF type information, type information of a link where an RLF has occurred, information about an operation used for RLF recovery by an IAB node having detected the RLF, information about a cell or node where the RLF is detected, or information about a timer.

Another aspect of the present disclosure may provide an IAB node including a communicator, and a controller configured to receive, from a parent IAB node, RLF detection indication, based on receiving of the RLF detection indication, perform handover to a target cell or routing to a different path other than a path via the parent IAB node or operation resumption with respect to the parent IAB node.

Advantageous Effects

According to disclosed embodiments, information about a cell to be excluded in cell selection in a link failure between Access Backhauled (IAB) nodes is given, so that connection to an inappropriate cell in re-connection after the link failure may be prevented to make fast failure recovery available, and according to another idea, a method by which, as a link failure indicator is transferred to a lower node, the lower node can rapidly perform handover is provided to prevent traffic loss of an access terminal of the lower node.

DESCRIPTION OF DRAWINGS

FIG. 9 illustrates a flowchart of an operating method of an IAB node attempting an initial access according to an embodiment of the present disclosure.

FIG. 10 illustrates a flowchart of a method by which, when an IAB node establishes Radio Resource Control (RRC) connection to a donor central unit (CU) again after the IAB node performs a handover (HO) or reestablishment operation, the donor CU updates cell exclusion information of each IAB node, according to an embodiment of the present disclosure.

FIG. 13 is a diagram for describing operations between a normal IAB node and an access UE.

FIG. 14 is a diagram for describing operations between an IAB node and an access UE according to an embodiment of the present disclosure.

MODE FOR INVENTION

Figure 1:
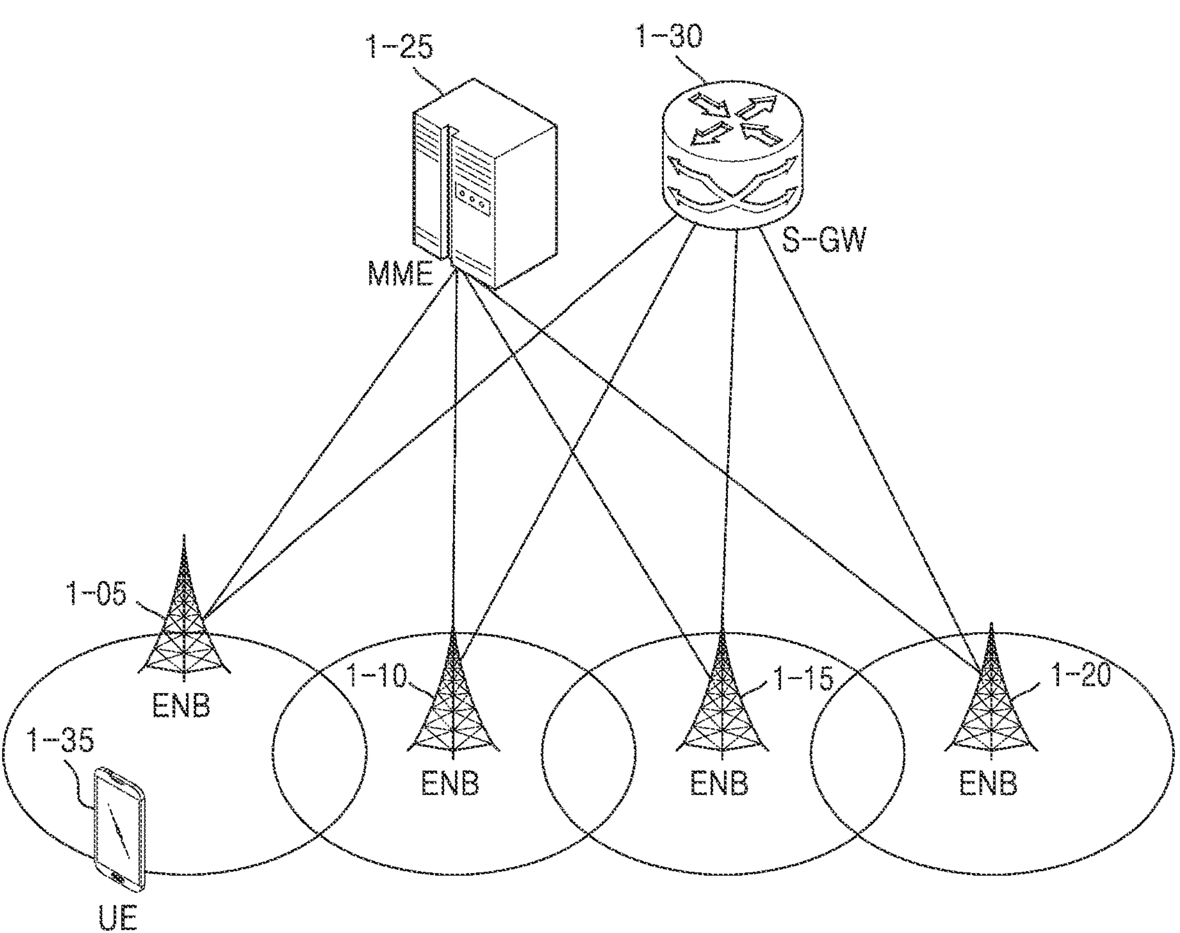
FIG. 1 is a diagram illustrating an architecture of a long term evolution (LTE) system according to an embodiment of the present disclosure.

Advantages and features of the present disclosure and methods of accomplishing the same may be understood more readily by reference to the following detailed descriptions of embodiments and accompanying drawings of the present disclosure. The present disclosure may, however, be embodied in many different forms and should not be construed as being limited to the embodiments set forth herein. Rather, these embodiments are provided so that this disclosure will be thorough and complete, and will fully convey the concept of the present disclosure to one of ordinary skill in the art. Therefore, the scope of the present disclosure is defined by the appended claims. Throughout the specification, like reference numerals refer to like components.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term " . . . unit" as used in the present embodiment refers to a software or hardware component, such as field-programmable gate array (FPGA) or application-specific integrated circuit (ASIC), which performs certain tasks. However, the term " . . . unit" does not mean to be limited to software or hardware. A " . . . unit" may be configured to be in an addressable storage medium or configured to operate one or more processors. Thus, a " . . . unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and " . . . units" may be combined into fewer components and " . . . units" or further separated into additional components and " . . . units". Further, the components and " . . . units" may be implemented to operate one or more central processing units (CPUs) in a device or a secure multimedia card. Also, in embodiments, " . . . unit" may include one or more processors.

In the description of the present disclosure, detailed descriptions of the related art are omitted when it is deemed that they may unnecessarily obscure the essence of the present disclosure. Hereinafter, embodiments of the present disclosure will be described in detail with reference to accompanying drawings.

Hereinafter, terms identifying an access node, terms indicating network entities, terms indicating messages, terms indicating an interface between network entities, and terms indicating various pieces of identification information, as used in the following descriptions, are exemplified for convenience of descriptions. Therefore, the present disclosure is not limited to terms to be described below, and other terms indicating objects having equal technical meanings may be used.

For convenience of descriptions, in the present disclosure, terms and names defined in the 3$^{rd}$ Generation Partnership Project Long Term Evolution (3GPP LTE) standard are used therein. However, the present disclosure is not limited to the terms and names, and may also be applied to systems conforming to other standards. In the present disclosure, an evolved node B (eNB) may be interchangeably used with a next-generation node B (gNB) for convenience of descriptions. That is, a base station (BS) described by an eNB may represent a gNB. Also, the term "terminals" may refer to not only mobile phones, narrowband Internet of Things (NB-IoT) devices, and sensors but also other wireless communication devices.

Hereinafter, a BS is an entity that allocates resources to a terminal, and may be at least one of a gNode B, an eNode B, a Node B, a base station (BS), a radio access unit, a BS controller, or a node on a network. Examples of the terminal may include a user equipment (UE), a mobile station (MS), a cellular phone, a smartphone, a computer, a multimedia system capable of performing a communication function, or the like. However, the present disclosure is not limited to the examples above.

In particular, the present disclosure may be applied to 3GPP NR (5G mobile communication standard). Also, the present disclosure is applicable to intelligent services (e.g., smart home, smart building, smart city, smart car or connected car, health care, digital education, retail, security, and safety services) based on 5G communication technology and IoT technology. In the present disclosure, an eNB may be interchangeably used with a gNB for convenience of descriptions. That is, a BS described by an eNB may represent a gNB. Also, the term "terminals" may refer to not only mobile phones, NB-IoT devices, and sensors but also other wireless communication devices.

Wireless communication systems providing voice-based services in early stages are being developed to broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), LTE-Pro of 3GPP, high rate packet data (HRPD), ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink (DL) and employs single carrier-frequency division multiple access (SC-FDMA) for an uplink (UL). The UL refers to a radio link for transmitting data or a control signal from a terminal (e.g., a UE or an MS) to a base station (e.g., an eNB or a BS), and the DL refers to a radio link for transmitting data or a control signal from the base station to the terminal. The above-described multiple access schemes identify data or control information of each user in a manner that time-frequency resources for carrying the data or control information of each user are allocated and managed not to overlap each other, that is, to achieve orthogonality therebetween.

As post-LTE communication systems, i.e., 5G communication systems need to support services capable of freely reflecting and simultaneously satisfying various requirements of users, service providers, and the like. Services considered for the 5G systems include enhanced mobile broadband (eMBB), massive machine-type communication (mMTC), ultra-reliability low-latency communication (URLLC) services, or the like.

According to some embodiments, the eMBB aims to provide an improved data rate than a data rate supported by the legacy LTE, LTE-A, or LTE-Pro. For example, in a 5G communication system, the eMBB should be able to provide a peak data rate of 20 Gbps in a DL and a peak data rate of 10 Gbps in an UL at one BS. Also, the 5G communication system may have to simultaneously provide the peak data rate and an increased user-perceived data rate of a terminal. In order to satisfy such requirements, the 5G communication system may request improvement in various transmission/reception technologies including an improved multiple-input multiple-output (MIMO) transmission technology. Also, a data rate required in the 5G communication system may be satisfied by using a frequency bandwidth wider than 20 MHz in the 3 GHz to 6 GHz or 6 GHz or more frequency band, instead of the legacy LTE transmitting a signal by using maximum 20 MHz in the 2 GHz band.

Simultaneously, the mMTC is being considered to support application services such as IoT in 5G communication systems. In order to efficiently provide the IoT, the mMTC may require the support for a large number of terminals in a cell, improved coverage for a terminal, improved battery time, reduced costs of a terminal, and the like. Because the IoT is attached to various sensors and various devices to provide a communication function, the mMTC should be able to support a large number of terminals (e.g., 1,000,000 terminals/$km^2$) in a cell. Also, because a terminal supporting the mMTC is likely to be located in a shadow region failing to be covered by the cell, such as the basement of a building, due to the characteristics of the service, the terminal may require wider coverage than other services provided by the 5G communication system. The terminal supporting the mMTC should be configured as a low-cost terminal and may require a very long battery life time of 10 to 15 years because it is difficult to frequently replace the battery of the terminal.

Lastly, the URLLC refers to cellular-based wireless communication services used for mission-critical purposes such as services for remote control of robots or machinery, industrial automation, unmanned aerial vehicles, remote health care, emergency alerts, and the like. Therefore, the URLLC should provide communications providing very low latency (ultra-low latency) and very high reliability (ultra reliability). For example, a service supporting the URLLC should satisfy air interface latency of less than 0.5 milliseconds, and simultaneously has a requirement for a packet error rate of $10^{-5}$ or less. Thus, for the service supporting the URLLC, the 5G system should provide a transmit time interval (TTI) smaller than other services and may simultaneously have a design requirement for allocating wide resources in a frequency band so as to achieve reliability of a communication link.

The three services of the eMBB, the URLLC, and the mMTC which are considered in the 5G communication system may be multiplexed and transmitted in one system. Here, in order to satisfy different requirements of the services, the services may use different transceiving schemes and different transceiving parameters. However, the above-described mMTC, URLLC, and eMBB services are merely examples and the types of services to which the present disclosure is applicable are not limited thereto.

Although LTE, LTE-A, LTE Pro, or 5G (or NR) systems are mentioned as examples in the following description, embodiments of the present disclosure may also be applied to other communication systems having similar technical backgrounds or channel types. Furthermore, the embodiments of the present disclosure may also be applied to other communication systems through partial modification without greatly departing from the scope of the present disclosure based on determination by one of ordinary skill in the art.

Hereinafter, operational principles of the present disclosure will be described in detail with reference to accompanying drawings. In the description of the present disclosure, detailed descriptions of the related art are omitted when it is deemed that they may unnecessarily obscure the essence of the present disclosure. The terms used in the specification are defined in consideration of functions used in the present disclosure, and can be changed according to the intent or commonly used methods of users or operators. Accordingly, definitions of the terms are understood based on the entire description of the present specification.

FIG. 1 is a diagram illustrating an architecture of a legacy LTE system.

Referring to FIG. 1, a radio access network of the LTE system may include a plurality of next-generation BSs (e.g., eNBs, nodes B, or BSs) 1-05, 1-10, 1-15, and 1-20, a mobility management entity (MME) 1-25, and a serving-gateway (S-GW) 1-30. A user equipment (UE) (or a terminal) 1-35 may access an external network via the eNB 1-05, 1-10, 1-15, or 1-20 and the S-GW 1-30

In FIG. 1, the eNB 1-05, 1-10, 1-15, or 1-20 may correspond to a legacy node B of a universal mobile telecommunications system (UMTS). The eNB may be connected to the UE 1-35 via wireless channels and may perform complex functions, compared to the legacy node B. In the LTE system, all user traffic data including real-time services such as voice over Internet protocol (VoIP) may be serviced via shared channels. Therefore, an entity for performing scheduling by collating status information of UEs, the state information including buffer state information, available transmit power state information, and channel state information, may be required and the eNB 1-05, 1-10, 1-15, or 1-20 may operate as such an entity One eNB may generally control a plurality of cells. For example, the LTE system may use a radio access technology such as orthogonal frequency division multiplexing (OFDM) at a bandwidth of 20 MHz so as to achieve a data rate of 100 Mbps. Also, the LTE system may use adaptive modulation & coding (AMC) to determine a modulation scheme and a channel coding rate in accordance with a channel state of the UE. The S-GW **1*a*-30 is an entity for providing data bearers and may generate or remove the data bearers according to the control by the MME 1*a*-25. The MME 1*a*-25** is an entity for performing a mobility management function and various control functions on the UE and may be connected to the plurality of eNBs.

Figure 2:
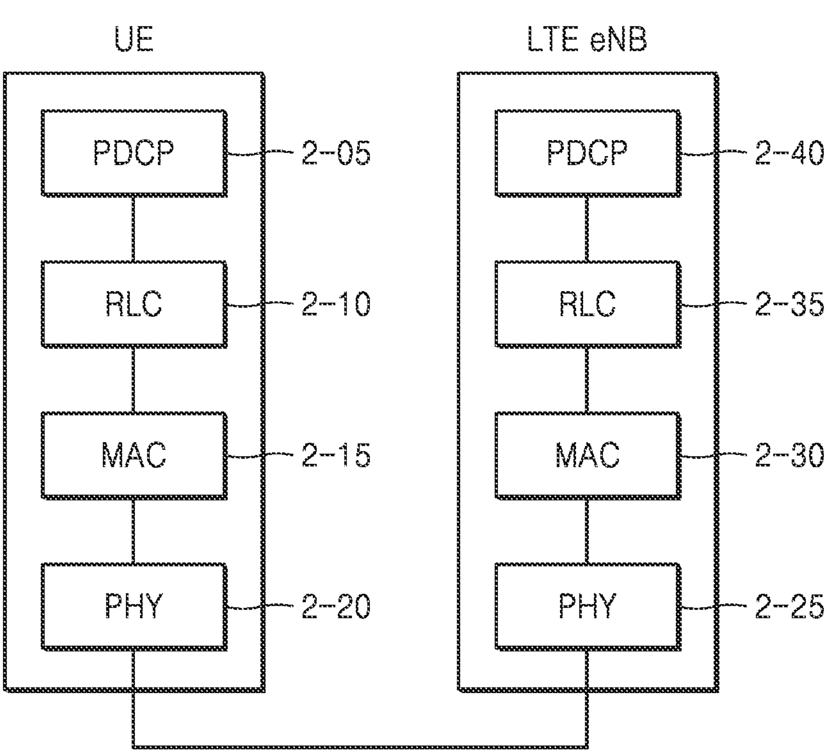
FIG. 2 is a diagram illustrating a radio protocol architecture of an LTE system according to an embodiment of the present disclosure.

FIG. 2 is a diagram illustrating a radio protocol architecture of an LTE system according to an embodiment of the present disclosure.

Referring to FIG. 2, the radio protocol architecture of the LTE system may include packet data convergence protocol (PDCP) layers 2-05 and 2-40, radio link control (RLC) layers 2-10 and 2-35, and media access control (MAC) layers 2-15 and 2-30 respectively for a UE and a LTE eNB The PDCP layer may perform an operation such as Internet protocol (IP) header compression/decompression. Main functions of the PDCP may be summarized as below.

Header compression and decompression: Robust Header Compression (ROHC) only

Transfer of user data

In-sequence delivery of upper layer Protocol Data Units (PDUs) at Packet Data Convergence Protocol (PDCP) re-establishment procedure for Radio Link Control (RLC) Acknowledged Mode (AM)

For split bearers in Dual Connectivity (DC) (only support for RLC AM): PDCP PDU routing for transmission and PDCP PDU reordering for reception Duplicate detection of lower layer SDUs at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink.

The RLC layer 2-10 or 2-35 may perform an Automatic Repeat Request (ARQ) operation by reconfiguring PDCP PDUs to appropriate sizes. Main functions of the RLC layer may be summarized as below.

Transfer of upper layer PDUs

Error Correction through ARQ (only for AM data transfer)

Concatenation, segmentation and reassembly of RLC SDUs (only for Unacknowledged mode (UM) and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC Service Data Unit (SDU) discard (only for UM and AM data transfer)

RLC re-establishment

The MAC layer **1*b*-15 or 1*b*-30** may be connected to a plurality of RLC layers configured for one UE, and may multiplex RLC PDUs into a MAC PDU and may demultiplex the RLC PDUs from the MAC PDU. Main functions of the MAC layer may be summarized as below.

Mapping between logical channels and transport channels

Multiplexing/demultiplexing of MAC SDUs belonging to one or different logical channels into/from TB (transport blocks) delivered to/from the physical layer on transport channels Scheduling information reporting Error correction through Hybrid Automatic Repeat Request (HARQ)

Priority handling between logical channels of one UE

Priority handling between UEs by means of dynamic scheduling

Multimedia Broadcast and Multicast Service (MBMS) service identification

Transport format selection

Padding

The PHY layer 2-20 or 2-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer.

Figure 3:
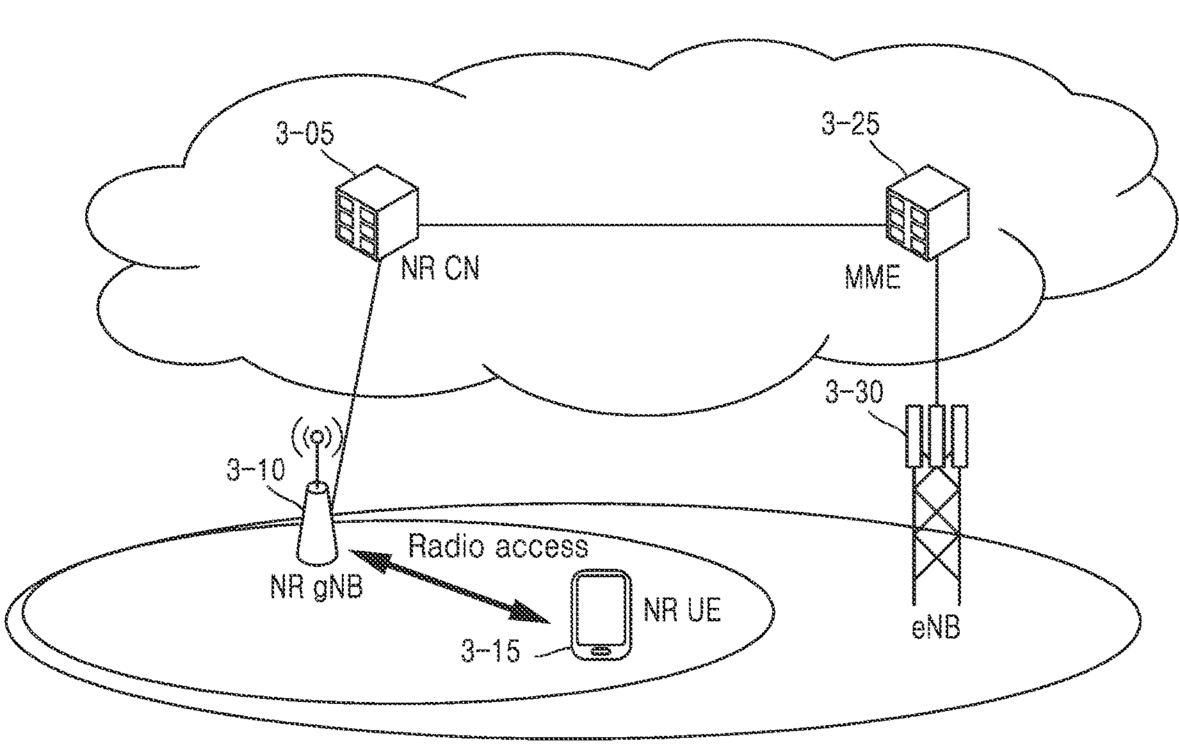
FIG. 3 is a diagram illustrating an architecture of a next-generation mobile communication system according to an embodiment of the present disclosure.

FIG. 3 is a diagram illustrating an architecture of a next-generation mobile communication system according to an embodiment of the present disclosure.

Referring to FIG. 3, a radio access network of the next-generation mobile communication system (e.g., a NR or 5G system) may include a next-generation BS (e.g., a new radio node B (NR gNB or NR BS) 3-10 and a new radio core network (NR CN) 3-05. A NR UE (or NR terminal) 3-15 may access an external network via the NR gNB 3-10 and the NR CN 3-05.

In FIG. 3, the NR gNB 3-10 may correspond to an eNB of a legacy LTE system. The NR gNB 3-10 may be connected to the NR UE 3-15 via wireless channels and may provide superior services compared to a legacy node B. In the NR or 5G system, all user traffic data may be serviced via shared channels. Therefore, an entity for performing scheduling by collating buffer state information of UEs, available transmit power state information, and channel state information may be required, and the NR gNB 3-10 may operate as the entity. One NR gNB may control a plurality of cells. In the NR or 5G system, a bandwidth greater than the maximum bandwidth of the legacy LTE system may be applied to achieve a data rate that is ultra-higher than the legacy LTE system. Also, a beamforming technology may be additionally associated with OFDM as a radio access technology Also, AMC may be used to determine a modulation scheme and a channel coding rate in accordance with a channel state of the NR UE. The NR CN 3-05 may perform functions such as mobility support, bearer establishment, and quality of service (QoS) configuration. The NR CN is an entity for performing a mobility management function and various control functions on the NR UE and may be connected to a plurality of base stations. Also, the NR or 5G system may cooperate with the legacy LTE system, and the NR CN may be connected to an MME 3-25 via a network interface. The MME may be connected to a legacy eNB 3-30.

Figure 4:
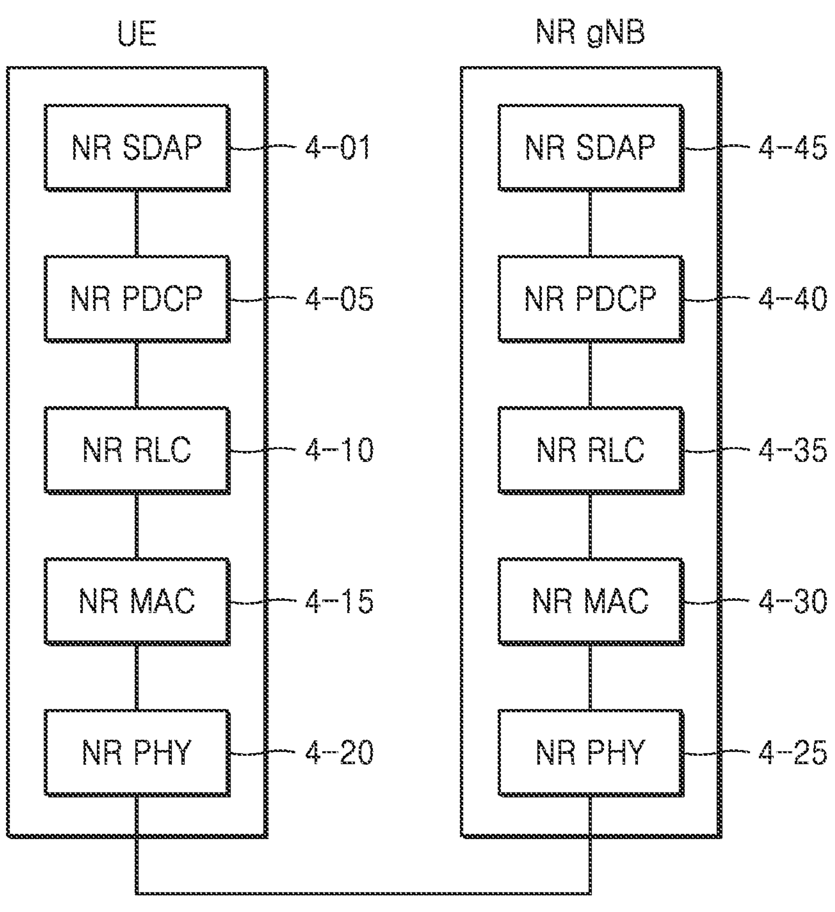
FIG. 4 is a diagram illustrating a radio protocol architecture of a next-generation mobile communication system according to an embodiment of the present disclosure.

FIG. 4 is a diagram illustrating a radio protocol architecture of a next-generation mobile communication system according to an embodiment of the present disclosure.

Referring to FIG. 4, the radio protocol architecture of the next-generation mobile communication system may include NR service data adaptation protocol (SDAP) layers 4-01 and 4-45, NR PDCP layers 4-05 and 4-40, NR RLC layers 4-10 and 4-35, NR MAC layers 4-15 and 430, and NR physical (PHY) layers 4-20 and 4-25 respectively for a UE and an NR gNB.

Main functions of the NR SDAP layer 4-01 or 4-45 may include some of functions below.

Transfer of user plane data

Mapping between a QoS flow and a data radio bearer (DRB) for both DL and UL

Marking QoS flow identification (ID) in both DL and UL packets

Reflective QoS flow to DRB mapping for the UL SDAP PDUS.

With regard to the NR SDAP layer, the UE may be configured with information about whether to use a header of the NR SDAP layer or to use functions of the NR SDAP layer by a Radio Resource Control (RRC) message, which is received from the BS, per PDCP layer, per bearer, or per logical channel. When the SDAP header is configured, a 1-bit non access stratum (NAS) reflective QoS indicator and a 1-bit access stratum (AS) reflective QoS indicator of the SDAP header may be used to indicate the UE to update or reconfigure UL and DL QoS flow and data bearer mapping information. The SDAP header may include QoS flow ID information indicating QoS. QoS information may be used as data processing priority information or scheduling information for appropriately supporting a service.

Main functions of the NR PDCP layer 4-05 or 4-40 may include some of functions below.

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink.

In the descriptions above, the reordering function of the NR PDCP layer may indicate a function of reordering PDCP PDUs received from a lower layer, on a PDCP sequence number (SN) basis. The reordering function of the NR PDCP layer may include a function of delivering the reordered data to an upper layer in order or may include a function of immediately delivering the reordered data out of order, may include a function of recording missing PDCP PDUs by reordering the received PDCP PDUs, may include a function of reporting status information of the missing PDCP PDUs to a transmitter, and a function of requesting to retransmit the missing PDCP PDUs.

Main functions of the NR RLC layer 4-10 or 4-35 may include at least some of functions below.

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment In the descriptions above, the in-sequence delivery function of the NR RLC layer may indicate a function of delivering RLC SDUs received from a lower layer, to an upper layer in order. When a plurality of RLC SDUs segmented from one RLC SDU are received, the in-sequence delivery function of the NR RLC layer may include a function of reassembling the RLC SDUs and delivering the reassembled RLC SDU.

The in-sequence delivery function of the NR RLC layer may include a function of reordering received RLC PDUs on a RLC SN or PDCP SN basis, may include a function of recording missing RLC PDUs by reordering the received RLC PDUs, may include a function of reporting status information of the missing RLC PDUs to a transmitter, and may include a function of requesting to retransmit the missing RLC PDUs.

The in-sequence delivery function of the NR RLC layer may include a function of delivering only RLC SDUs prior to a missing RLC SDU, to an upper layer in order when the missing RLC SDU exists.

The in-sequence delivery function of the NR RLC layer may include a function of delivering all RLC SDUs received before a timer starts, to an upper layer in order when a certain timer is expired, even when a missing RLC SDU exists.

The in-sequence delivery function of the NR RLC layer may include a function of delivering all RLC SDUs received up to a current time, to an upper layer in order when a certain timer is expired, even when a missing RLC SDU exists.

The NR RLC layer may process the RLC PDUs in order of reception and may deliver the RLC PDUs to the NR PDCP layer, regardless of SNs (out-of-sequence delivery).

When the NR RLC layer receives a segment, the NR RLC layer may reassemble the segment with other segments stored in a buffer or subsequently received, into a whole RLC PDU and may deliver the RLC PDU to the NR PDCP layer.

The NR RLC layer may not have a concatenation function, and the NR MAC layer may perform the concatenation function or the concatenation function may be replaced with a multiplexing function of the NR MAC layer.

In the descriptions above, the out-of-sequence delivery function of the NR RLC layer may refer to a function of directly delivering RLC SDUs received from a lower layer, to an upper layer out of order. The out-of-sequence delivery function of the NR RLC layer may include a function of reassembling a plurality of RLC SDUs segmented from one RLC SDU and delivering the reassembled RLC SDU when the segmented RLC SDUs are received. The out-of-sequence delivery function of the NR RLC layer may include a function of recording missing RLC PDUs by storing RLC SNs or PDCP SNs of received RLC PDUs and reordering the received RLC PDUs.

The NR MAC layer 4-15 or 4-30 may be connected to a plurality of NR RLC layers configured for one UE, and main functions of the NR MAC layer may include some of functions below.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layer 4-20 or 4-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer.

Figure 5:
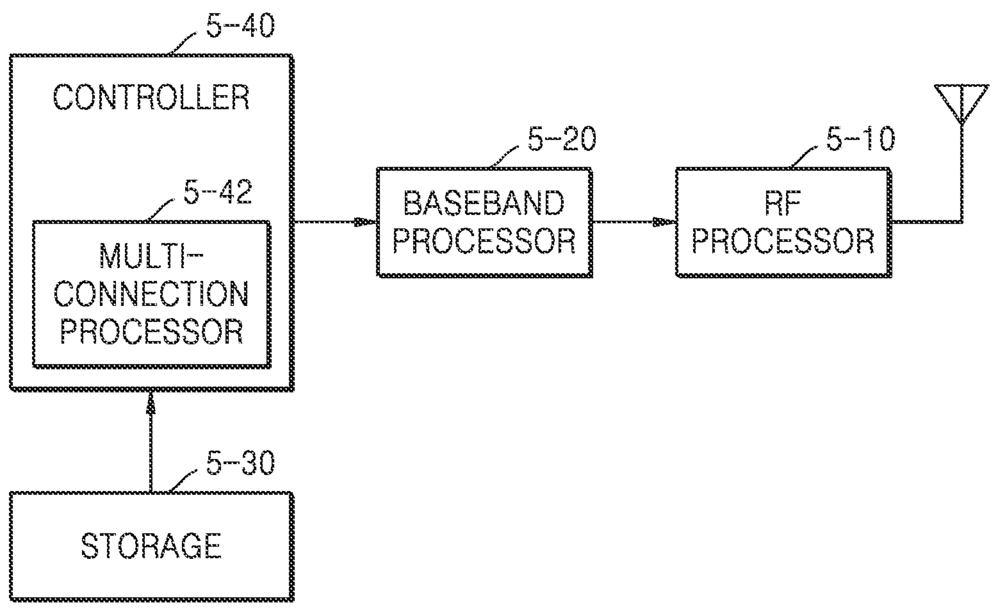
FIG. 5 is a block diagram illustrating an internal configuration of a user equipment (UE) according to an embodiment of the present disclosure.

FIG. 5 is a block diagram illustrating an internal configuration of a UE according to an embodiment of the present disclosure.

Referring to the drawing, the UE includes a radio frequency (RF) processor 5-10, a baseband processor 5-20, a storage 5-30, and a controller 5-40.

The RF processor 5-10 performs functions of transmitting and receiving signals via radio channels, such as band conversion and amplification of the signals. That is, the RF processor 5-10 up-converts a baseband signal provided from the baseband processor 5-20, into an RF band signal and then transmits the RF band signal via an antenna, and down-converts an RF band signal received via the antenna, into a baseband signal. For example, the RF processor 5-10 may include a transmission filter, a reception filter, an amplifier, a mixer, an oscillator, a digital-to-analog convertor (DAC), an analog-to-digital convertor (ADC), or the like. Although only one antenna is illustrated in FIG. 5, the UE may include a plurality of antennas. Also, the RF processor 5-10 may include a plurality of RF chains. In addition, the RF processor 5-10 may perform beamforming. For beamforming, the RF processor 5-10 may respectively adjust phases and intensities of signals to be transmitted or received via a plurality of antennas or antenna elements. Also, the RF processor 5-10 may perform a MIMO operation and may receive a plurality of layers in the MIMO operation.

The baseband processor 5-20 converts between a baseband signal and a bitstream based on physical entity specifications of a system. For example, for data transmission, the baseband processor 5-20 generates complex symbols by encoding and modulating a transmission bitstream. For data reception, the baseband processor 5-20 reconstructs a received bitstream by demodulating and decoding a baseband signal provided from the RF processor 5-10. For example, according to an OFDM scheme, for data transmission, the baseband processor 5-20 generates complex symbols by encoding and modulating a transmit bitstream, maps the complex symbols to subcarriers, and then configures OFDM symbols by performing inverse fast Fourier transform (IFFT) and cyclic prefix (CP) insertion. For data reception, the baseband processor 5-20 segments a baseband signal provided from the RF processor 5-10, into OFDM symbol units, reconstructs signals mapped to subcarriers by performing fast Fourier transform (FFT), and then reconstructs a received bitstream by demodulating and decoding the signals.

The baseband processor 5-20 and the RF processor 5-10 transmit and receive signals as described above. Accordingly, the baseband processor 5-20 and the RF processor 5-10 may also be called a transmitter, a receiver, a transceiver, or a communicator. In addition, at least one of the baseband processor 5-20 and the RF processor 5-10 may include a plurality of communication modules to support a plurality of different radio access technologies. Also, at least one of the baseband processor 5-20 and the RF processor 5-10 may include different communication modules to process signals of different frequency bands. For example, the different radio access technologies may include a wireless LAN (e.g.: IEEE 802.11), a cellular network (e.g.: LTE), or the like. Also, the different frequency bands may include a super-high frequency (SHF) (e.g., 2.NRHz, NRhz) band and a millimeter wave (mmWave) (e.g., 60 GHz) band.

The storage 5-30 stores basic programs, application programs, and data, e.g., configuration information, for operations of the UE. In particular, the storage 5-30 may store information associated with a second access node that performs wireless communication by using a second radio access technology. The storage 5-30 provides the stored data according to the request by the controller 5-40.

The controller 5-40 controls overall operations of the UE. For example, the controller 5-40 transmits and receives signals through the baseband processor 5-20 and the RF processor 5-10. Also, the controller 5-40 records and reads data on or from the storage 5-40. To this end, the controller 5-40 may include at least one processor. For example, the controller 5-40 may include a communication processor (CP) for controlling communications and an application processor (AP) for controlling an upper layer such as an application program.

Figure 6:
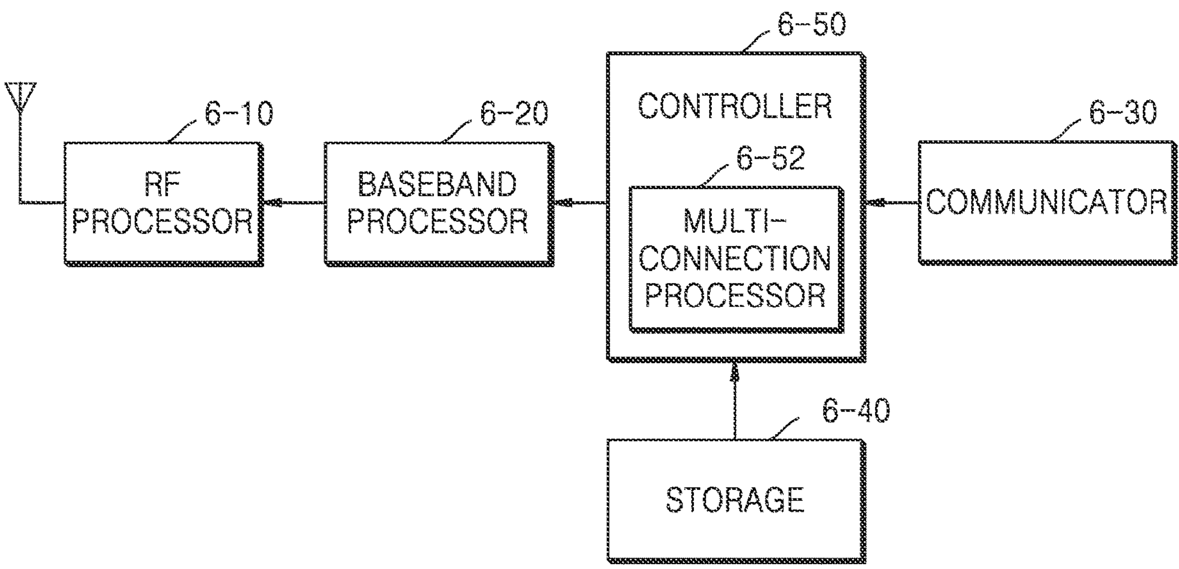
FIG. 6 is a block diagram illustrating a configuration of a base station (BS) according to an embodiment of the present disclosure.

FIG. 6 is a block diagram illustrating a configuration of a BS according to an embodiment of the present disclosure.

As illustrated in FIG. 6, the BS includes a RF processor 6-10, a baseband processor 6-20, a communicator 6-30, a storage 6-40, and a controller 6-50.

The RF processor 6-10 performs functions of transmitting and receiving signals via radio channels, e.g., band conversion and amplification of the signals. That is, the RF processor 6-10 up-converts a baseband signal provided from the baseband processor 6-20, into an RF band signal and then transmits the RF band signal via an antenna, and down-converts an RF band signal received via an antenna, into a baseband signal. For example, the RF processor 6-10 may include a transmission filter, a reception filter, an amplifier, a mixer, an oscillator, a DAC, an ADC, or the like. Although only one antenna is illustrated in FIG. 6, a first access node may include a plurality of antennas. Also, the RF processor 6-10 may include a plurality of RF chains. In addition, the RF processor 6-10 may perform beamforming. For beamforming, the RF processor 6-10 may respectively adjust phases and intensities of signals to be transmitted or received via a plurality of antennas or antenna elements. The RF processor may perform a DL MIMO operation by transmitting one or more layers.

The baseband processor 6-20 converts between a baseband signal and a bitstream, based on physical entity specifications of a first radio access technology. For example, for data transmission, the baseband processor 6-20 generates complex symbols by encoding and modulating a transmission bitstream. Also, for data reception, the baseband processor 6-20 reconstructs a received bitstream by demodulating and decoding a baseband signal provided from the RF processor 6-10. For example, according to an OFDM scheme, for data transmission, the baseband processor 6-20 generates complex symbols by encoding and modulating a transmission bitstream, maps the complex symbols to subcarriers, and then configures OFDM symbols by performing IFFT and CP insertion. Also, for data reception, the baseband processor 6-20 segments a baseband signal provided from the RF processor 6-10, into OFDM symbol units, reconstructs signals mapped to subcarriers by performing FFT, and then reconstructs a received bitstream by demodulating and decoding the signals. The baseband processor 6-20 and the RF processor 6-10 transmits and receives signals as described above. Accordingly, the baseband processor 6-20 and the RF processor 6-10 may also be called a transmitter, a receiver, a transceiver, a communicator, or a wireless communicator.

The backhaul communicator 6-30 provides an interface for communicating with other nodes in a network. That is, the backhaul communicator 6-30 converts a bitstream, which is transmitted from the primary BS to another node, for example, a secondary BS, a core network, etc. into a physical signal, and converts a physical signal, which is received from another node, into a bitstream.

The storage 6-40 stores basic programs, application programs, and data, e.g., configuration information, for operations of a primary BS. In particular, the storage 6-40 may store information about bearers allocated for a connected UE and measurement results reported from the connected UE. Also, the storage 6-40 may store criteria information used to determine whether to provide or release dual connectivity to or from the UE. The storage 6-40 provides the stored data according to the request by the controller 6-50.

The controller 6-50 controls overall operations of the primary BS. For example, the controller 6-50 transmits and receives signals via the baseband processor 6-20 and the RF processor 6-10, or the backhaul communicator 6-30. Also, the controller 6-50 records and reads data on or from the storage 6-40. To this end, the controller 6-50 may include at least one processor.

Figure 7:
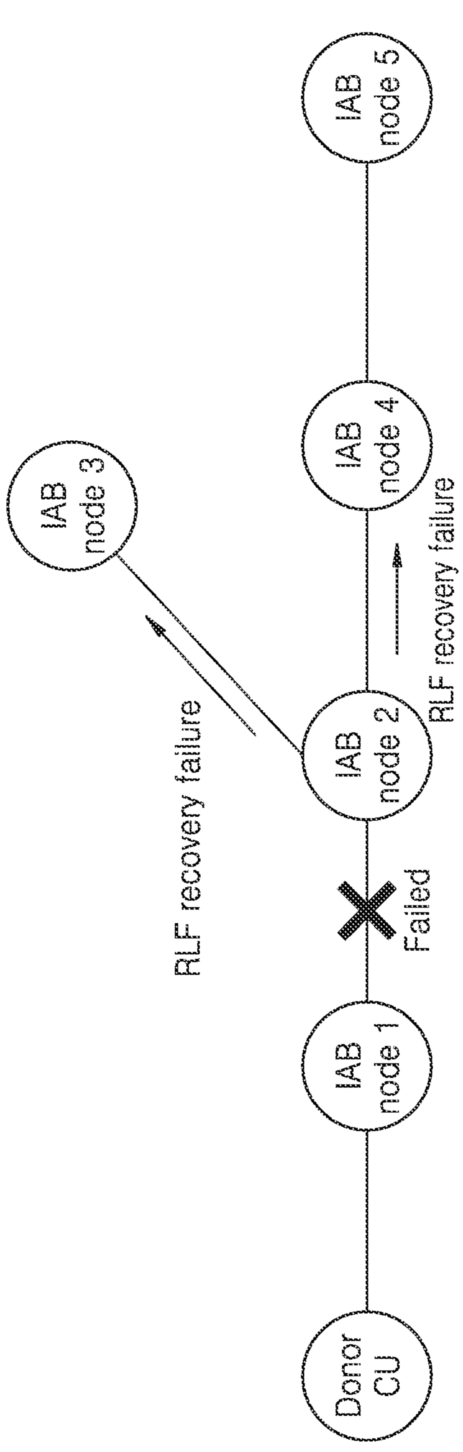
FIG. 7 illustrates topology information according to an embodiment of the present disclosure.

FIG. 7 illustrates topology information according to an embodiment of the present disclosure.

Each of Integrated Access Backhauled (IAB) node is connected to an IAB donor node, and as an IAB donor central unit (CU) is in the IAB donor node, each IAB node is connected to the IAB donor CU. In the example of FIG. 7, IAB node 2 may detect a Radio Link Failure (RLF) of connection to IAB node 1 that is a parent node. After detection of the RLF, IAB node 2 may perform an RRC reestablishment operation. When the RRC reestablishment operation fails, IAB node 2 may transmit recovery failure notification to IAB node 3 and IAB node 4 which are lower nodes of IAB node 2.

Figure 8:
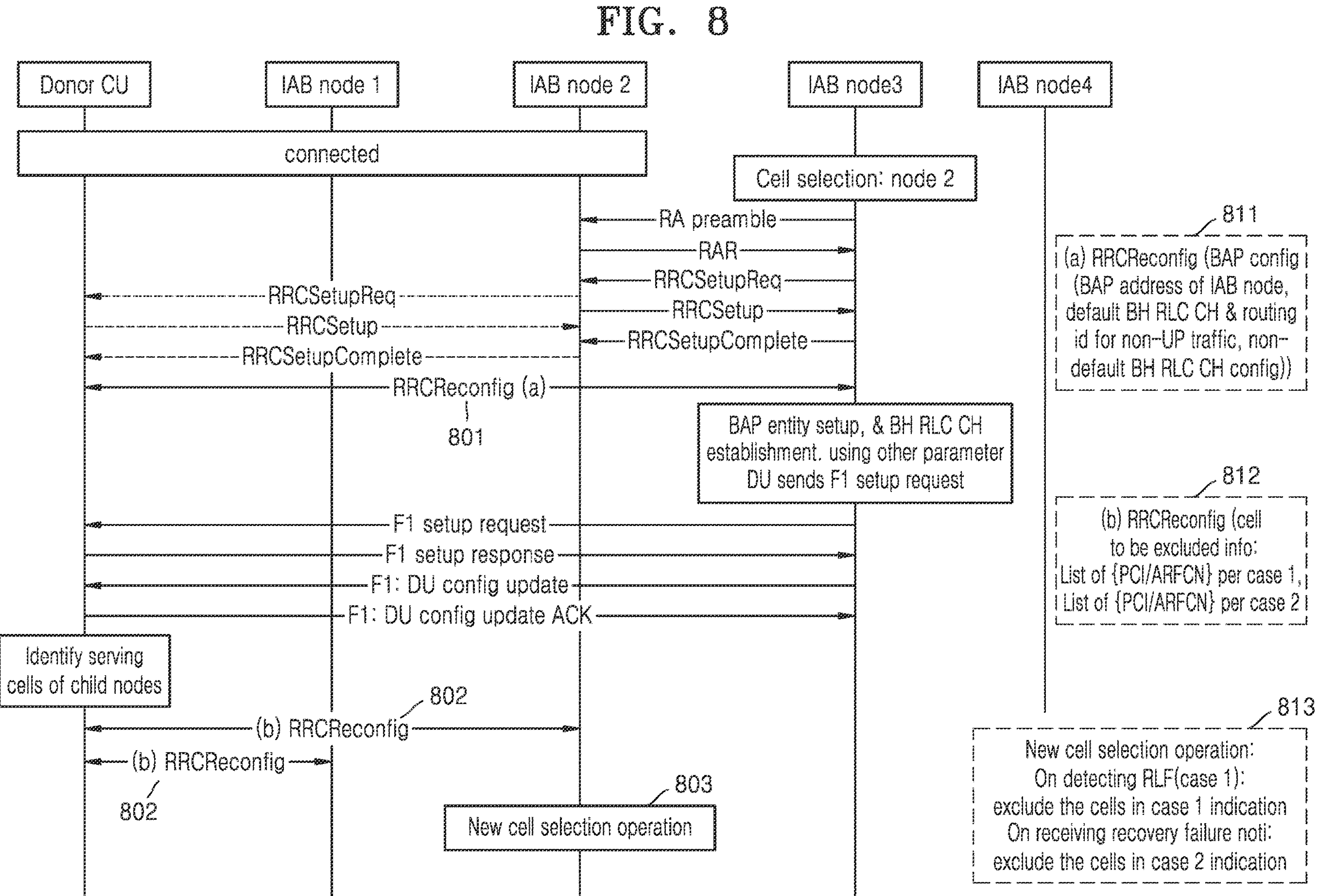
FIG. 8 illustrates a flowchart of a method by which, after an Integrated Access Backhauled (IAB) node makes an initial access, the IAB node receives cell exclusion information according to an embodiment of the present disclosure.

FIG. 8 illustrates a flowchart of a method by which, after an IAB node makes an initial access, the IAB node receives cell exclusion information according to an embodiment of the present disclosure.

Referring to FIG. 8, new IAB node 3 may select IAB node 2 to be a parent node and may perform a random access procedure with IAB node 2. After IAB node 3 performs the random access procedure, IAB node 3 may obtain UL grant and may transfer an RRCsetup request an IAB donor CU. An RRC message may be encapsulated and transferred to a backhaul RLC channel via the parent node. An RRC layer of the donor CU may transmit an RRC setup message to IAB node 3. When receiving the RRC setup message, IAB node 3 may transmit an RRCsetupcomplete message, so that new IAB node 3 may establish RRC connection to the donor CU. Afterward, the donor CU may transmit, via RRCReconfiguration message (a) 801, Backhaul Adaptation Protocol (BAP) configuration information (e.g., BAP address of IAB node 3, default UL BH RLC CH, default UL routing id for non-UP traffic, and non-default BH RLC CH config).

In paragraph 811 of FIG. 8, an example of a plurality of pieces of information being transmitted via the RRCReconfiguration message (a) 801 is disclosed.

When receiving the BAP configuration information, IAB node 3 may set a BAP and may apply the given configuration information. A Distributed Unit (DU) of IAB node 3 may perform a F1 setup request to the donor CU, by using the given configuration information. When receiving the information, the donor CU may set up F1 interface by transmitting configuration information associated with F1 setup. A message of the F1 setup request may include served cell information (e.g., NR Cell Global Identity (CGI), NR Physical Cell ID (PCI), Tracking Area Code (TAC), served Public Land Mobile Network (PLMN), Frequency Division Duplex (FDD)/Time Division Duplex (TDD) configuration information for each cell and frequency information of each case, measurement time configuration information, etc.) the DU can serve. Based on the plurality of pieces of served cell, the donor CU may add, to a F1 setup response message, information about cells to be activated, and may transmit the message to IAB node 3 that is an access IAB node. The information about cells to be activated may include CGI and PCI of a cell to be activated, and system information, and available PLMN information. Therefore, the DU may activate the cell indicated by CGI and PCI, and may broadcast system information provided for the cell by the CU. In this procedure, the donor CU may obtain information about the cell that is actually served by the DU of the access IAB (e.g., IAB node 3 of FIG. 8)

In addition, after the F1 interface is set up, the donor CU may additionally update DU information about a new access IAB node via the F1 interface. A DU configuration update message among F1 messages may be used. When receiving the DU configuration update message, the donor CU may fix and transmit updated DU configuration information to be finally used to the DU that transmitted the message. In this procedure, served cells may be additionally added or modified, or a plurality of pieces of configuration information of the served cells may be changed.

Based on a plurality of pieces of information of DUs, the donor CU may always manage most-recent DU information. Based on topology of IAB nodes accessing the donor CU based on recent DU information, the donor CU may transmit, via RRCReconfiguration message (b), information about cell to be excluded in cell selection by each IAB node to each IAB node the donor CU manages. The information about cell to be excluded in cell selection may include what is below. In paragraph 812 of FIG. 8, an example of a plurality of pieces of information being transmitted via the RRCReconfiguration message (b) 802 is disclosed.

A case of a link failure between IAB nodes may include cases below.

Case 1: When an IAB node detects an RLF of a link to a parent node.

Case 2: When an IAB node receives recovery failure notification from a parent node.

Cell exclusion information of each failure may include information below.

NR Absolute Radio Frequency Channel Number (ARFCN): Information about a frequency on which a cell to be excluded exists.

PCI: Physical cell id of a cell to be excluded

Cell exclusion information may be about multiple cells. Cell exclusion information to be described below may indicate list information of an indicator of each failure case and a combination of NR ARFCN and PCI associated with the indicator.

For example, when an IAB node detects an RLF, cell exclusion information of the IAB node may be a lower IAB node (i.e., child IAB node) of the IAB node that detects the RLF. As another example, when an IAB node receives RLF recovery failure notification from a parent node, cell exclusion information may include not only its lower IAB node (child IAB node) but also may include the parent node that transmitted the RLF recovery failure notification and a child node of the parent node. The donor CU may determine cell exclusion information by considering entire topology and relative location/signal strength.

For example, the cell exclusion information may be transmitted from the donor CU via RRCReconfiguration (b) message or an RRC message corresponding thereto. As another example, the cell exclusion information may be transmitted to each IAB node via a message on F1-Application Protocol (AP). As another example, child nodes of each IAB node may directly transmit cell information to its parent node. When child nodes of each IAB node directly transmits cell information to its parent node, a BAP layer signal may be used. In this case, cell exclusion only to a child node may be performed.

IAB nodes that receive a message including the cell exclusion information may detect an RLF from a link to its parent node, or when RLF recovery failure notification is received from a parent node, in cell selection, the IAB nodes may select a cell other than an excluded cell by using cell exclusion information corresponding to each case (803) and may perform an RRCreestablishment operation.

In paragraph 813 of FIG. 8, disclosed is an example of a cell selection operation (803) IAB node 2 performs by using cell exclusion information corresponding to each case.

FIG. 9 illustrates a flowchart of an operating method of an IAB node attempting an initial access according to an embodiment of the present disclosure.

An IAB Mobile Termination (MT) establishes RRC connection to a donor CU.

The CU may allocate, via an RRCreconfiguration message, BAP configuration information and an IP address used for a corresponding IAB node DU, and the IAB node may obtain at least one of the BAP configuration information and the allocated IP address.

The IAB node may set up a BAP entity and may establish a (default) BH RLC channel ((default) BH RLC CH)). The IAB node may request the CU for a F1 setup request by using the information obtained from the CU.

The CU may receive the F1 setup request and may transmit the F1 setup response message, thereby notifying the DU of configuration information about a serving cell of the DU. F1 setup may be completed via the procedure described above.

In addition, there may be a procedure in which the CU checks a request when the DU requests DU configuration information update.

After the donor CU identifies DU configuration information of the IAB node that made the initial access, the donor CU may transfer, to each IAB node via an RRC reconfiguration message, failure case information (e.g., a case where an RLF is detected, a case where RLF recovery failure notification is received) and cell exclusion information (NR ARFCN, PCI) for each case. In this case, the same information may be transferred via a F1-AP message.

IAB nodes having received information from the donor CU may detect an RLF or may receive RLF recovery failure notification, and may perform cell selection while each cell is excluded based on cell exclusion information for each case.

For example, when the IAB nodes detects an RLF or receives recovery failure notification from a parent node, the IAB nodes may receive information about a cell to be excluded in each cell selection, by using an RRC message received from the donor CU.

When the IAB nodes detects an RLF or receives recovery notification failure from a parent node, the IAB nodes may check whether a corresponding cause is due to detection of the RLF or reception of the recovery failure notification and may use it to exclude a cell corresponding to each case of the received cell exclusion information. In addition, in the procedure above, when it is the recovery notification failure, the parent node may add, to the recovery failure notification, ARFCN and PCI that is information of a cell for which RLF is detected by the parent node, and may deliver the recovery failure notification to its child IAB node. When necessary, in cell selection, the child node may additionally exclude the cell for which RLF is detected, in addition to the cell exclusion information.

When performing a cell selection operation, an IAB node may exclude a corresponding cell, based on cell exclusion information received in operation described above. When the IAB node reads a Synchronization Signal Block (SSB) and performs measurement, information about an ARFCN on which the SSB is located and PCI information included in the SSB match pre-received cell exclusion information, the IAB node may not perform an additional cell selection procedure for reading System Information Block1 (SIB1) of the corresponding cell but may select a different cell.

FIG. 10 illustrates a flowchart of a method by which, when an IAB node establishes RRC connection to a donor CU again after the IAB node performs a handover (HO) or reestablishment operation, the donor CU updates cell exclusion information of each IAB node, according to an embodiment of the present disclosure.

Compared to the initial access procedure shown in FIG. 9, a procedure in which IAB MT receives a HO command or performs RRC Connection Re-establishment (RRE) may be added. Afterward, a procedure in which the donor CU recognizes BAP setup, BAP configuration and F1 setup, and DU configuration information corresponds to descriptions provided with reference to FIG. 9, and thus, redundant descriptions are omitted.

Figure 11:
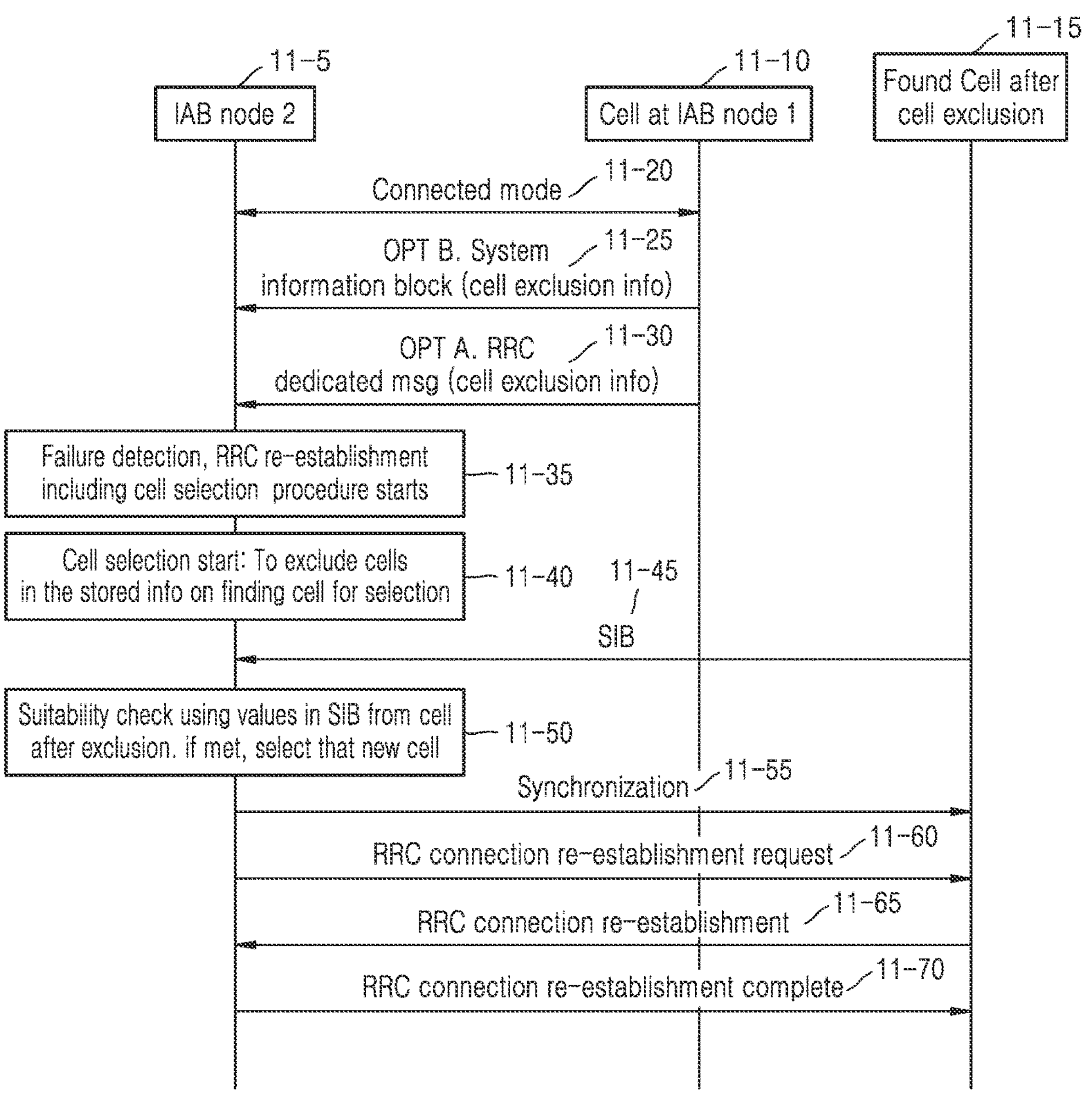
FIG. 11 illustrates a flowchart of a cell exclusion operation of an IAB node in a failure occasion of a UE according to an embodiment of the present disclosure.

FIG. 11 illustrates a flowchart of a cell exclusion operation of an IAB node in a failure occasion of a UE according to an embodiment of the present disclosure.

IAB node 2 11-5 may be RRC connected to IAB donor CU via a cell of IAB node 1 11-10. The IAB node 2 11-5 may receive cell exclusion information via system information 11-25 or an RRC dedicated message 11-30. When a failure occurs, the IAB node 2 in the connected state may perform RRC re-establishment by using the given cell exclusion information (11-35). The failure occasion may include a failure occasion such as a radio link failure, an RLC failure, a reconfiguration failure, an integrity check failure, a handover failure, and the like which are detected by an RRC layer. Also, an occasion where an IAB node receives RLF recovery failure notification from a parent IAB node may be included in the failure occasion.

The IAB node 2 11-5 may perform cell selection as a sub operation of the re-establishment operation (11-40). According to a legacy cell selection scheme, when the IAB node 2 11-5 uses stored information, if a cell found by using at least one of pre-given carrier frequency information, pre-given cell information stored according to measurement control, and information of pre-detected cell is approved via a suitability check, the IAB node 2 11-5 may select the cell.

In the present disclosure, it is assumed that the cell exclusion information is already transferred via an RRC dedicated message or SIB and/or Master Information Block (MIB) message, and information of the cell is stored in the IAB node 2 11-5. When a cell selected according to the legacy cell selection scheme, based on the transferred cell information, corresponds to the cell exclusion information, the IAB node 2 11-5 may exclude the cell. A reference for determining whether it is a cell corresponding thereto may be whether it is cell selection due to a failure occasion included in the cell exclusion information and whether frequency information among a plurality of pieces of cell exclusion information associated with the failure occasion corresponds to PCI. When the cell selected according to the legacy cell selection scheme is the same as cells corresponding to the cell exclusion information, the IAB node 2 11-5 may re-select different cells from which the cell selected according to the legacy cell selection scheme is excluded.

After the cell exclusion procedure, the IAB node 2 11-5 may find a re-selected cell (11-40). The IAB node 2 11-5 may read cell selection information of SIB and/or MIB of the re-selected (found) cell 11-15. The IAB node 2 11-5 may perform a suitability check (11-50). The IAB node 2 11-5 may perform the suitability check by using values in the SIB of the cell 11-15 after cell exclusion (11-50). When the cell 11-15 is approved via the suitability check, the IAB node 2

11-5 may perform synchronization with the cell 11-15 (11-60). The IAB node 2 11-5 may transmit an RRC connection re-establishment request (11-60). The selected cell 11-15 may check whether it has UE context, and if yes, may transmit a re-establishment message to the RRC connection IAB node 2 11-5 (11-65). The IAB node 2 11-5 may transmit an RRC connection re-establishment complete message, in response to the RRC connection re-establishment message (11-70).

In operation (11-45), QrxlevIABcell QqualIABcell information may not be included in a cell selection parameter received from system information received from the cell 11-15 selected by the IAB node 2 11-5. When the QrxlevIABcell QqualIABcell information is not included in the cell selection parameter, the IAB node 2 11-5 may evaluate, for the suitability check, a cell selection standard by using a legacy cell selection factor, and may perform the suitability check. If QrxlevIABcell QqualIABcell information is included in system information received by the IAB node 2 11-5 in operation (11-45), the IAB node 2 11-5 may perform the suitability check by using the received information.

In another embodiment, if an IAB node receives RLF detection or RLF recovery failure notification from a parent IAB node, a DU of the IAB node having received the RLF detection or the RLF recovery failure notification may mute an iab-support indicator in SIB1. In this case, IAB MT that performs neighboring cell selection reads corresponding SIB1 and thus identifies that there is no iab-support, and is not able to perform cell selection on a cell corresponding thereto. That is, the cell selection to the corresponding cell may be barred. In the descriptions below, "RLF detection indication" may have the same meaning as an indicator of "under RLF recovery".

In this regard, more particularly, when a random IAB node detects an RLF, if Cell Group (CG) identification for each link is not performed or if the IAB node is able to perform a Master Cell Group (MCG) failure information procedure, operations below may be available.

- When the IAB node detects (or declares) an RLF for a link to one parent node and there is an available link to a different parent node (i.e., a case where a link to the different parent node is not an RLF or is not radio bearer suspension), the IAB node does not transfer RLF detection indication to its child node.
- If the IAB node detects the RLF for the link to the one parent node and does not have an available link to a different parent node (i.e., even if there is a link to the different parent node, the link is an RLF or a RLF recovery state or a radio bearer suspension state, or an RRCReestablishment procedure starts), the IAB node may transfer RLF detection indication to its child node.

If CG identification is performed for each link and the IAB node is not able to perform a MCG failure information procedure, operations below may be available.

- When the IAB node is configured with dual connection and then detects an RLF for a Secondary Cell Group (SCG) link, and when a MCG link is not in an RLF occasion or is not a radio bearer suspension occasion, the IAB node does not transfer RLF detection indication to its child node.
- When the IAB node is configured with dual connection and then detects an RLF for a MCG link (or starts an RRCReestablishment procedure), the IAB node may transfer RLF detection indication to its child node, regardless of a state of an SCG link.
- When the IAB node is configured with single connection (or is not configured with an SCG) and detects an RLF for a MCG link, the IAB node may transfer RLF detection indication to its child node.

In this regard, the IAB node having transferred the RLF detection indication to the child node may transfer RLF recovery success indication to the child IAB node to which the RLF detection indication was previously transferred.

- If an entity itself (e.g., an IAB node that generates and transfers RLF detection indication) succeeds in an RLF recovery operation in a single connection occasion, i.e., succeeds in RRC Reestablishment (e.g., successfully transmits an RRCReestablishmentComplete message to a new target cell), or if the entity successfully transmits an RRCReconfigurationComplete message to the new target cell in an occasion where attemptCHO configuration is given.

In a case where an entity itself (e.g., an IAB node that generates and transfers RLF detection indication) transfers the RLF detection indication to its child node in a dual connection occasion, if an RRC Reestablishment procedure is successfully completed (when attemptCHO configuration is not given to the entity), or if RRCReconfigurationComplete is transmitted to a newly-selected cell (when attemptCHO configuration is given to the entity)

The child IAB node having received the RLF detection indication may mute iab-support indication that is transmitted via SIB1 from cells served by a DU of the child IAB node. That is, the child IAB node may not transmit iab-support indication.

In more detail, when CG identification is not performed, an IAB node having received the RLF detection indication

- Case a: when a link to a different parent node exists other than a link for which the RLF detection indication is received, and the link to the different parent node has no problem, an iab-support indicator transmitted via SIB1 of cells served by the DU of the child IAB node having received the RLF detection indication may be muted. In this case, IAB nodes including an IAB node having transmitted the RLF detection indication, which perform neighboring cell selection, are not able to select a cell of the muted IAB DU.
- Case b: When a link to a different parent node exists other than a link for which the RLF detection indication is received, and the link to the different parent node has no problem, iab-support indication broadcast via SIB1 of cells served by the DU may be broadcast or may be kept broadcasting. In this case, IAB nodes including an IAB node having transmitted the RLF detection indication, which perform neighboring cell selection, are able to select a cell served by the DU of this IAB node according to the broadcast indicator.
- Case c: When a link to a different parent node other than a link for which the RLF detection indication is received has a problem or there is no link to the different parent node, iab-support indication broadcast via SIB1 of cells served by the DU may be muted. In this case, IAB nodes including an IAB node having transmitted the RLF detection indication, which perform neighboring cell selection, are not able to select a cell of the muted IAB DU.

When CG identification is performed, an IAB node having received RLF detection indication

- Case a: when a link for which the RLF detection indication is received is SCG, iab-support indication transmitted via SIB1 of cells served by the DU may be muted. In this case, IAB nodes including an IAB node having transmitted the RLF detection indication, which perform neighboring cell selection, are not able to select a cell of the muted IAB DU.

Case b: When a link for which the RLF detection indication is received is SCG, iab-support indication transmitted via SIB1 of cells served by the DU may be broadcast or may be kept broadcasting. In this case, IAB nodes including an IAB node having transmitted the RLF detection indication, which perform neighboring cell selection, are able to select a cell of the DU of this IAB node, according to the broadcast indicator.

Case c: When a link for which the RLF detection indication is received is MCG,

If the IAB node having received the RLF detection indication is in a DC configures state and a MCG failure information procedure is available, and then an SCG link is not RLF or radio bearer suspension state, iab-support indication transmitted via SIB1 of cells served by the DU of the IAB node having received the RLF detection indication may be broadcast or may be kept broadcasting.

If the condition is not true, iab-support indication transmitted via SIB1 of cells served by the DU of the IAB node having received the RLF detection indication may be muted.

When iab-support indication transmitted via SIB1 of the DU is muted according to at least one operation described above, the IAB node has to remain muted until RLF recovered indication is received from a parent node from which the RLF detection indication was received. When the IAB node receives an RLF recovery failure (or an RLF notification indicator) before the RLF recovered indication is received, the IAB node may remain muted or may re-broadcast iab-support indication.

The RLF detection indication/RLF recovered indication may be transferred by using a BAP control plane signal or a MAC CE.

Only one of case a and case b of an IAB-support indication muting procedure by the DU is available. In Case a, the parent IAB node having transferred the RLF detection indication may perform, as a child node, cell selection and connection configuration with respect to a child node having received the RLF detection indication, according to a cell selection result.

In another embodiment where IAB-support indication (or, IAB-support bit) is muted, when RLF recovery failure notification is received from a parent IAB node, an IAB node having received the RLF recovery failure notification may mute IAB-support indication (or, IAB-support bit) being broadcast via SIB1.

According to an embodiment of the present disclosure, after an IAB node detects an RLF, the IAB node may transmit RLF detection notification to its child node, and the child node having received the notification may perform a mobility procedure.

Figure 12:
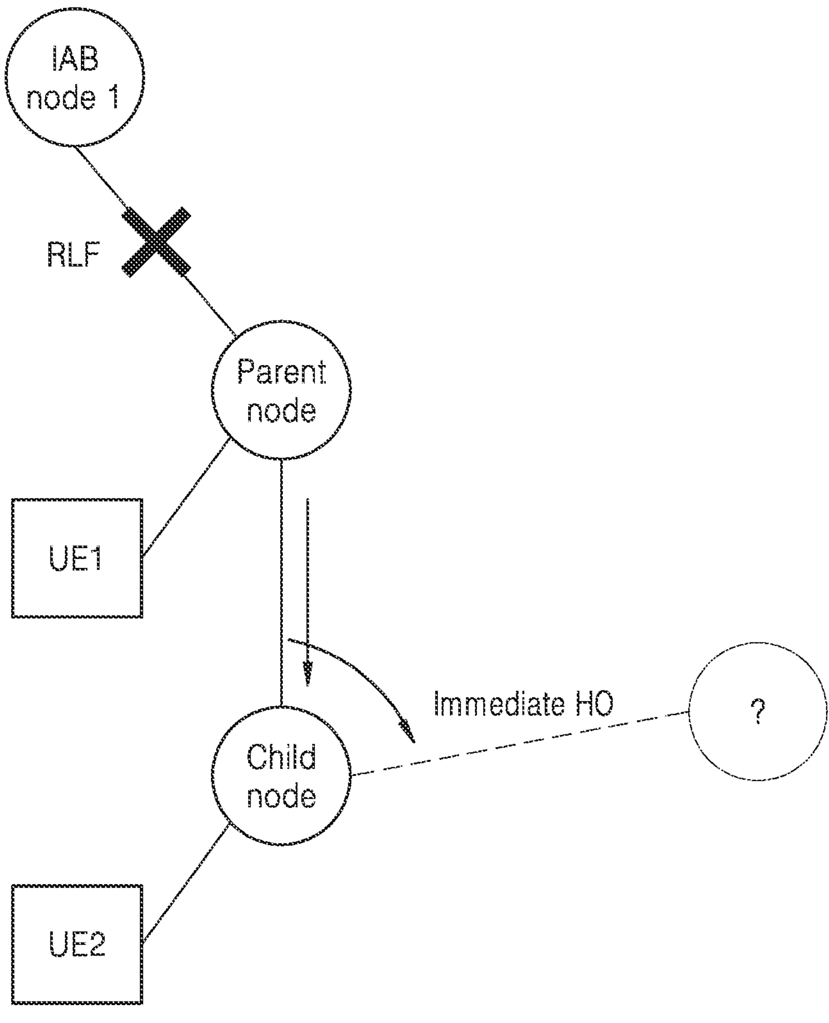
FIG. 12 illustrates an example of topology according to an embodiment of the present disclosure.

FIG. 12 illustrates an example of topology according to an embodiment of the present disclosure.

IAB node 1, a parent node, and a child node may be connected to an IAB donor CU via multiple hops. When the parent node is connected to the IAB node 1 with single connection and detects an RLF, the parent node may transfer RLF detection notification to the child node. When receiving the RLF detection notification, the child node may move to search for another cell (e.g., a cell in a different IAB node).

FIG. 13 is a diagram for describing operations between a normal IAB node and an access UE.

When a parent IAB node detects an RLF and performs recovery and then finally fails in the recovery, the parent IAB node may transfer RLF recovery failure notification to its child IAB node. When receiving the RLF recovery failure notification, the child IAB node performs an RLF recovery operation by itself. A DU part of the child node may perform normal UL/DL data transmission/reception and then, after reception of the notification, may variously operate according to implementations.

FIG. 14 is a diagram for describing operations between an IAB node and an access UE according to an embodiment of the present disclosure.

When a parent IAB node detects an RLF, the parent IAB node may transmit an RLF detection notification signal 1401 to its child node. Information below may be added to the RLF detection notification signal 1401.

| Information included in RLF detection notification: |
| --- |
| - RLF type, |
| - MCG/SCG RLF indication → If MCG, recovery may require long time. If SCG, it can be solved soon. |
| - Each case, operation information for RLF recovery(e.g., only RRE, attemptCHO, MCGFailureInformation , SCGFailureInformation, and combination with RRE.) |
| - RLF detected cell /node info. (BAP address , PCI /frequency ) → In new operation 1, if cell selection is is performed on child node, avoiding may be requested. |
| - timer : If this timer is expired, a given particular mobility procedure is performed. See the bottom right for the Mobility procedure. |

Information included in the RLF detection notification 1401:

RLF type: RLF type indicates information about a cause of occurrence of the RLF.

A type of a link where the RLF occurs (e.g., Master Cell Group (MCG)/Secondary Cell Group (SCG)

Information about an operation to be used, for RLF recovery, by an IAB node that detected the RLF (e.g., only RRCreestablishment, attemptCHO, MCGFailureInformation, SCGFailureInformation, or a combination of operations above and RRE.)

Information about cell/node where the RLF is detected (e.g., BAP address of the node, PCI/frequency of the cell)

timer: When a timer is expired, the IAB node may perform a particular mobility procedure. The mobility procedure will be described below.

The RLF detection notification message 1401 may be transmitted by a control PDU of a BAP layer. However, it may be transmitted by an RRC message via a donor CU.

When receiving the RLF detection notification 1401, the child IAB node may perform an operation 1402 below.

New operation 1 (at child IAB node):

[when RLF detection notification received]

in BAP:

if there is no other path available in routing entry than through parent IAB node, child IAB node doesn't send UL BAP PDU to its parent IAB node which sent RLF detection notification. And buffers those UL BAP PDU. Associate these buffered data to the BAP address otherwise, child IAB node reroute the BAP PDU destined to parent IAB node using backup path in the routing.

in RRC (some mobility procedure):

OPT1. no special mobility operation

OPT2. if there is no other path than through parent IAB node (not received neither RLF detection nor recovery failure notification), use conditional SCG addition; or CHO: to one of preconfigured CHO candidates which has higher than A4 threshold (no serving cell condition, no A3); or attempt CHO; or just cell selection except the current serving cell without any further HO the selection of above option depends on received information in RLF detection notification or fixed. (i.e., OPT3. timer is given in RLF detection notification, upon expiry of that timer, mobility solutions in OPT2 can be triggered.

[upon completion of BAP reconfiguration through above mobility procedure before receiving success notification] In other words, if the HO is completed first.

in BAP: if there is any buffered UL BAP PDU, it sends them to the new parent node in RRC: follow HO procedure and further BAP/IP address configuration.

[when recovery success notification is received before above mobility completion (timer is given case)]

in BAP:

if there is any buffered UL BAP PDU, it sends them to the recovered parent node.

in RRC: stop timer, and not doing mobility

[when RLF Detection Notification is Received]

BAP layer:

If there is only a link to the parent IAB node that transferred the RLF detection notification on a routing entry of the BAP (or, if there is no available path except a routing entry via the parent IAB node), the child IAB node may not transmit a UL BAP PDU to the parent IAB node that transferred the RLF detection notification but may store the UL BAP PDU in a buffer. Then, the child IAB node may associate a plurality of pieces of buffered data with a BAP address of the parent node.

If another path exists, the child IAB node may transmit a BAP PDU by rerouting the BAP PDU via a backup path to a different parent node. The child IAB node may reroute the BAP PDU indicated for transfer to the parent IAB node, by using the backup path in routing.

RRC layer:

OPT1. The child IAB node may perform the mobility procedure. As the child IAB node is RRC-disconnected with respect to the donor CU, the child IAB node may perform the mobility procedure using a pre-defined operation.

The child IAB node may perform one of operations below.

Conditional SCG addition

Conditional Hand Over (CHO)

CHO to a corresponding candidate cell when the candidate cell is selected after cell selection To perform only cell selection Each of the operations above, sub-operations below may be requested.

According to an embodiment, a requested operation for the conditional SCG addition is as below.

The donor CU in a connected state may transfer in advance condition information for SCG addition and SCG configuration information to an IAB node.

The condition for SCG addition may include measurement configuration information based on A3/A4/A5 for a target pscell and a condition of reception of RLF detection notification.

The donor CU may request a target parent IAB node for SCG configuration information, and may receive and transfer the SCG configuration information to the child IAB node.

The IAB node having received the SCG configuration information and a condition of the SCG addition may perform evaluation for the condition, and at a time when the condition is satisfied, the IAB node may add a cell of the SCG corresponding to the SCG configuration and may start data transmission or reception with the cell corresponding thereto.

CHO:

The donor CU in a connected state may transfer in advance, to an IAB node, target cell configuration information for handover to a target candidate cell and condition information for selecting a target cell corresponding thereto.

The donor CU may transfer, as the condition for selecting the target cell, measurement id associated with a reporting type based on A4 for assuring a link quality of a target pcell, and may additionally transfer an indicator indicating to use "reception of RLF detection notification from parent IAB node" as the condition.

In particular, measurement id may be associated with a particular candidate target cell and is associated with target cell configuration information of the particular candidate target cell.

When the condition information for selecting the target cell and the target cell configuration information are received in advance, the child IAB node may perform measurement based on measurement id that is the condition information of the candidate target cell. During the measurement, if a cell that meets a measurement condition of the candidate target cell is found when RLF detection notification is received, the child IAB node may perform handover to one of target cells that meet a condition corresponding thereto.

Attemptcho:

The child IAB node in a connected state may receive and store target cell configuration information for CHO.

When RLF detection notification is received from a parent node, the child IAB node may perform cell selection, and if a selected cell is one of given target cells for CHO, the child IAB node may perform handover by using given configuration information of a target cell corresponding thereto.

To Perform Only Cell Selection:

When RLF detection is received from a parent node, a child IAB node may select a particular cell by performing cell selection. Afterward, when RLF recovery failure notification is received, the child IAB node may perform a remaining operation of RRC reestablishment with the selected cell.

Operations described above and a timer operation may be associated.

When there is a timer value included in RLF detection notification, the child IAB node may start a timer at a time when the RLF detection notification is received. When the timer is expired, the child IAB node may perform one of given mobility operations. If RLF success notification is received from the parent IAB node before the timer is expired, the child IAB node may not perform the mobility operations and may resume an operation with the existing parent IAB node. In this case, BAP may transmit pre-buffered UL BAP PDUs to the recovered parent IAB node, and RRC may stop a running timer.

Also, when the child IAB node determined an ingress link, for which RLF detection notification was received, as unavailable, and receives the RLF recovery success notification, the child IAB node may recognize the ingress link as available and may reflect, to a routing operation, the ingress link as an available link (or next hop).

OPT2. According to an embodiment, when there is no other path except for a path via a parent IAB node, a child IAB node may perform one of operations below.

Use conditional SCG addition

CHO: to one of preconfigured CHO candidates which has higher than A4 threshold (no serving cell condition, no A3)

attempt CHO

Perform only cell selection except for a recent serving cell without additional handover (just cell selection except the current serving cell without any further HO)

Selection of the option above may be determined based on information received in RLF detection notification or may be fixed.

OPT3. If a timer is given in RLF detection notification, when the timer is expired, a mobility solution in OPT2 may be triggered.

[Case where Operation of Child IAB Node is First Completed Before Success Notification is Received from Parent Node]

BAP:

If there are buffered UL BAP PDUs, the child IAB node via BAP may transmit the buffered UL BAP PDUs to a new parent node and may resume communication.

RRC:

The child IAB node may additionally set up BAP and may apply configuration. The child IAB node may follow a handover procedure and additional BAP/IP address configuration (follow HO procedure and further BAP/IP address configuration).

A reference by which a parent IAB node determines a recovery success 1403 may include at least one of references below. In order to define the recovery success 1403, at least one of references below may be requested.

| Recovery success definition needed:<br>- RRCreestablishment reception; or<br>- RRCreconfiguration after RRE; or<br>- attemptCHO success (ACK feedback of RRCreconfigurationcomplete); or<br>- In case of MCGFailureinformation, HO complete or<br>- In case of SCGFailureInformation, HO complete or<br>- After (or during) the RRC operation, when BAP configuration is (newly) received by RRC or F1-AP or<br>- When IAB IP address is allocated after the BAP configuration is received |
|---|

Reception of RRCreestablishment

Transmission of RRCreestablishmentComplete

RRCreconfiguration received after RRC reestablishment

Successful transmission to a target cell of RRCreconfigurationComplete after CHO is performed (reception of ack feedback with respect to RRCreconfigurationComplete)

attemptCHO success (ACK feedback with respect to RRCreconfigurationcomplete)

HO complete in a case of MCGFailureInformation

HO complete in a case of SCGFailureInformation

After (or during) the RRC operation, BAP configuration is (newly) received by RRC or F1-AP IAB IP address is allocated after the BAP configuration is received A recovery success notification message 1404 that is additionally transferrable by the parent IAB node may further include information below.

| Information included in Recovery success notification : Node information for which RLF notification detection is given (BAP address), BAP information of newly updated node. |
|---|

Information about a node that previously provided RLF detection notification, i.e., information about itself (BAP address)

In addition, BAP configuration information (e.g., the BAP configuration information may include new BAP address, BH RLC CH configuration information, routing information, and IP address allocated to a DU and/TNL association information, and the like) which is newly configured after recovery is succeeded.

In the afore-described embodiments of the present disclosure, elements included in the present disclosure are expressed in a singular or plural form according to the embodiments of the present disclosure. However, the singular or plural form is appropriately selected for convenience of descriptions and the present disclosure is not limited thereto. As such, an element expressed in a plural form may also be configured as a single element, and an element expressed in a singular form may also be configured as plural elements.

Specific embodiments are described in the description of the present disclosure, but it will be understood that various modifications may be made without departing the scope of the present disclosure. Thus, the scope of the present disclosure is not limited to the embodiments described herein and should be defined by the appended claims and their equivalents.

The methods according to the embodiments described in the claims or the detailed description of the present disclosure may be implemented in hardware, software, or a combination of hardware and software.

When the methods are implemented in software, a computer-readable storage medium having one or more programs (software modules) stored therein may be provided. The one or more programs stored in the computer-readable storage medium are configured to be executable by one or more processors in an electronic device. The one or more programs include instructions to cause the electronic device to execute the methods according to the embodiments described in the claims or the detailed description of the present disclosure.

The programs (e.g., software modules or software) may be stored in random access memory (RAM), non-volatile memory including flash memory, read only memory (ROM), electrically erasable programmable read-only memory (EEPROM), a magnetic disc storage device, a CD-ROM, digital versatile discs (DVD), another type of optical storage device, or a magnetic cassette. Alternatively, the programs may be stored in a memory including a combination of some or all of the above-mentioned memory devices. In addition, each memory may refer to a plurality of memories.

Also, the programs may be stored in an attachable storage device which is accessible via a communication network such as the Internet, an intranet, a local area network (LAN), a wireless LAN (WLAN), or a storage area network (SAN), or a combination thereof. The storage device may be connected via an external port to an apparatus according to the embodiments of the present disclosure. Also, another storage device on the communication network may be connected to the apparatus performing the embodiments of the present disclosure.

In the afore-described embodiments of the present disclosure, elements included in the present disclosure are expressed in a singular or plural form according to the embodiments. However, the singular or plural form is appropriately selected for convenience of descriptions and the present disclosure is not limited thereto. As such, an element expressed in a plural form may also be configured as a single element, and an element expressed in a singular form may also be configured as plural elements.

Specific embodiments are described in the description of the present disclosure, but it will be understood that various modifications may be made without departing the scope of the present disclosure. Thus, the scope of the present disclosure is not limited to the embodiments described herein and should be defined by the appended claims and their equivalents. That is, it will be apparent to one of ordinary skill in the art that other modifications based on the technical ideas of the present disclosure are feasible. Also, the embodiments may be combined to be implemented, when required. For example, portions of the methods provided by the present disclosure may be combined with each other to enable the BS and the UE to operate. Also, although the embodiments are described based on 5G and NR systems, modifications based on the technical scope of the embodiments may be applied to other communication systems such as LTE, LTE-A, LTE-A-Pro systems, or the like.

The invention claimed is:

1. A method of a first Integrated Access Backhauled (IAB) node in a wireless communication system, the method comprising:

receiving, from a first parent IAB node, a Radio Link Failure (RLF) detection notification via a first backhaul adaptation protocol (BAP) control protocol data unit (PDU);

in response to the reception of the RLF detection notification, performing rerouting via a second parent IAB node;

receiving, from the first IAB node, either an RLF recovery success notification or an RLF recovery failure notification;

based on receiving the RLF recovery success notification from the first parent IAB node, identifying that a link associated with the first parent IAB node is to be available; and based on receiving the RLF recovery failure notification from the first parent IAB node, performing a radio resource control (RRC) re-establishment procedure.

2. The method of claim 1, further comprising:

performing a conditional handover based on the RLF detection notification.

3. The method of claim 1, further comprising:

identifying that the link associated with the first parent IAB node is not available after the RLF detection notification has been received and before the RLF recovery success notification has been received.

4. The method of claim 3, further comprising:

in case that the link associated with the first parent IAB node is available, performing the rerouting based on the link.

5. The method of claim 1, further comprising:

transmitting, to a child IAB node of the first IAB node, an RLF recovery failure notification in case that the RRC re-establishment procedure fails.

6. The method of claim 1, further comprising:

transmitting, to a child IAB node of the first IAB node, an RLF detection notification in case that the first IAB node initiates the RRC re-establishment procedure.

7. The method of claim 1, further comprising:

transmitting, to a child IAB node of the first IAB node, an RLF detection notification in case that there is no link other than unavailable link.

8. A method of a second Integrated Access Backhauled (IAB) node in a wireless communication system, the method comprising:

detecting a Radio Link Failure (RLF);

transmitting, to a child IAB node of the second IAB node, an RLF detection notification via a first backhaul adaptation protocol (BAP) control protocol data unit (PDU);

attempting RLF recovery;

transmitting, to the child IAB node, an RLF recovery success notification in case that the RLF recovery is successful; and transmitting, to the child IAB node, an RLF recovery failure notification in case that a radio resource control (RRC) re-establishment procedure fails.

9. A first Integrated Access Backhauled (IAB) node comprising:

a communicator; and a controller configured to:

receive, from a first parent IAB node, a Radio Link Failure (RLF) detection notification via a first backhaul adaptation protocol (BAP) control protocol data unit (PDU), in response to the reception of the RLF detection notification, perform rerouting via a second parent IAB node, receive, from the first IAB node, either an RLF recovery success notification or an RLF recovery failure notification, based on receiving the RLF recovery success notification from the first parent IAB node, identify that a link associated with the first parent IAB node is to be available, and based on receiving the RLF recovery failure notification from the first parent IAB node, perform a radio resource control (RRC) re-establishment procedure.

* * * * *